US010762259B1

(12) United States Patent
Ershov

(10) Patent No.: US 10,762,259 B1
(45) Date of Patent: Sep. 1, 2020

(54) CIRCUIT DESIGN/LAYOUT ASSISTANCE BASED ON SENSITIVITIES TO PARASITICS

(71) Applicant: Diakopto, Inc., San Jose, CA (US)

(72) Inventor: Maxim Ershov, San Jose, CA (US)

(73) Assignee: Diakopto, Inc., San Jose, CA (US)

( * ) Notice: Subject to any disclaimer, the term of this patent is extended or adjusted under 35 U.S.C. 154(b) by 0 days.

(21) Appl. No.: 16/429,007

(22) Filed: Jun. 2, 2019

Related U.S. Application Data

(60) Provisional application No. 62/682,743, filed on Jun. 8, 2018, provisional application No. 62/682,748, filed on Jun. 8, 2018.

(51) Int. Cl.
| | | |
|---|---|---|
| *G06F 30/00* | (2020.01) | |
| *G06F 30/30* | (2020.01) | |
| *G06F 30/398* | (2020.01) | |
| *G06F 111/04* | (2020.01) | |
| *G06F 111/20* | (2020.01) | |

(52) U.S. Cl.
CPC ............ *G06F 30/30* (2020.01); *G06F 30/398* (2020.01); *G06F 2111/04* (2020.01); *G06F 2111/20* (2020.01)

(58) Field of Classification Search
CPC .............................. G06F 30/30; G06F 30/398
USPC ........................................................ 716/102
See application file for complete search history.

(56) References Cited

U.S. PATENT DOCUMENTS

| | | |
|---|---|---|
| 5,767,542 A | 6/1998 | Nakamura |
| 6,381,730 B1 | 4/2002 | Chang |
| 6,591,402 B1 * | 7/2003 | Chandra ............... G06F 30/367 |
| | | 716/106 |
| 6,956,424 B2 | 10/2005 | Hohnel |
| 7,669,152 B1 | 2/2010 | Tchemiav |
| 7,756,472 B2 | 7/2010 | Darabi |

(Continued)

FOREIGN PATENT DOCUMENTS

CN      109948263 A     6/2019

OTHER PUBLICATIONS

"Sensitivity analysis in linear systems", A. Deif, Springer-Verlag, 1986, 234 pages.

(Continued)

*Primary Examiner* — Suchin Parihar
(74) *Attorney, Agent, or Firm* — Marc P. Schuyler

(57) ABSTRACT

A computer/software tool for electronic design automation (EDA) extracts parasitics from a post-layout netlist file for an integrated circuit (IC) design and uses these parasitics to model circuit behavior between one or more excitation points and one or more observation points for a given circuit design characteristic. Sensitivities of that given circuit design characteristic to each constituent parasitic (or a group of parasitics that might be, for example, associated with a given structural element such as a layer) are then computed. The computer/software tool generates a visual display based on the relative sensitivities; for example, in one embodiment, relative sensitivities can be color-coded to permit a designer to visualize sources of problems in the IC design. In other embodiments, the sensitivities can be filtered and/or processed, e.g., so as to provide EDA driven assistance to changes to reduce excessive sensitivities or sensitivities to certain parasitics.

26 Claims, 8 Drawing Sheets
(1 of 8 Drawing Sheet(s) Filed in Color)

(56) References Cited

U.S. PATENT DOCUMENTS

| | | | |
|---|---|---|---|
| 7,882,471 B1 | 2/2011 | Kariat | |
| 8,099,699 B2 | 1/2012 | Charlet | |
| 8,146,032 B2 | 3/2012 | Chen | |
| 8,195,439 B1 * | 6/2012 | Hussain | G06F 30/367 703/14 |
| 8,261,228 B1 * | 9/2012 | Gopalakrishnan | G06F 30/367 716/136 |
| 8,312,406 B2 | 11/2012 | Song | |
| 8,407,646 B2 * | 3/2013 | Chandramohan | G06F 30/398 716/126 |
| 8,453,102 B1 | 5/2013 | Pack | |
| 8,656,331 B1 | 2/2014 | Sundareswaran | |
| 8,700,377 B2 | 4/2014 | Bolcato | |
| 8,799,839 B1 | 8/2014 | Tetelbaum | |
| 8,856,720 B2 | 10/2014 | Yeh | |
| 8,954,917 B1 * | 2/2015 | Shu | G06F 30/367 716/136 |
| 9,141,740 B2 | 9/2015 | Liu | |
| 9,147,034 B1 * | 9/2015 | Hawkins | G06F 30/398 |
| 2005/0204318 A1 * | 9/2005 | Iadanza | G06F 30/367 716/102 |
| 2014/0282308 A1 * | 9/2014 | Chen | G06F 30/30 716/102 |
| 2014/0304670 A1 * | 10/2014 | Su | G06F 30/39 716/111 |
| 2015/0331981 A1 | 11/2015 | Mulvaney | |
| 2016/0079994 A1 | 3/2016 | Lee | |
| 2016/0125115 A1 | 5/2016 | Strang | |
| 2018/0068036 A1 * | 3/2018 | Oriordan | G06F 30/39 |
| 2019/0034574 A1 * | 1/2019 | Zhu | G06F 30/392 |
| 2019/0220552 A1 * | 7/2019 | Koranne | G06F 30/327 |

OTHER PUBLICATIONS

"Circuit Sensitivity to Interconnect Variation", Z. Lin, C. J. Spanos, L. S. Milor, and Y. T. Lin, IEE Transactions on Semiconductor Manufacturing, v. 11. No. 4, Nov. 1998, pp. 557-568.
"Minimizing Component-Variation Sensitivity in Single Op Amp Filters", Application Note 738, Maxim Integrated, Jul. 22, 2002, 18 pages.
"On the analysis of sensitivity to parasitic effects", G.S.Moschytz, IEE Journal on Electronic Circuits and Systems, vol. 3, No. 5, Sep. 1979, pp. 233-239.
"Large Change Response Sensitivity of Linear Networks", Haley, IEEE Transactions on Circuits and Systems, vol. 27, No. 4, Apr. 1980, pp. 305-310.
"The Generalized Adjoint Network and Network Sensitivities", S. Director and R. Rohrer, IEEE Transactions on Circuit Theory, vol. 16, No. 3, Aug. 1969, pp. 318-323.
"Incremental Versus Adjoint Models for Network Sensitivity Analysis", L. Vallese, IEEE Transactions on Circuits and Systems, vol. 21, No. 1, Jan. 1974, pp. 46-49.
"Computation of Sensitivities for Noncommensurate Networks", J. Bandler and R. Seviora, IEEE Transactions on circuit Theory, vol. 18, No. 1, Jan. 1971, pp. 174-178.
"Sensitivity assessment of parasitic effects in second-order active-filter configurations", J.K. Fidler, IEE Journal on Electronic Circuits and Systems, vol. 2 , No. 6, Nov. 1978, pp. 181-185.
"Sensitivity: Old Questions, Some New Answers", S. R. Parker, IEEE Transactions on Circuit Theory, vol. 18, No. 1, Jan. 1971, pp. 27-35.

M. J. McNutt, S. LeMarquis and J. L. Dunkley, "Systematic capacitance matching errors and corrective layout procedures," IEEE Journal of Solid-State Circuits, vol. 29, No. 5, May 1994, pp. 611-616.
"A fully differential layout placement paradox: Matching vs. full symmetry," H. Binici and J. Kostamovaara, 2008 15th IEEE International Conference on Electronics, Circuits and Systems, St. Julien's, Apr. 2008, pp. 344-347.
"Experimental investigation of the minimum signal for reliable operation of DRAM sense amplifiers," H. Geib, W. Weber, E. Wohlrab and L. Risch, IEEE Journal of Solid-State Circuits, vol. 27, No. 7, pp. 1028-1035, Jul. 1992.
"Mismatch sensitivity of a simultaneously latched CMOS sense amplifier," R. Sarpeshkar, J. L. Wyatt, N. C. Lu and P. D. Gerber, IEEE Journal of Solid-State Circuits, vol. 26, No. 10, pp. 1413-1422, Oct. 1991.
"A Self-Biased Charge-Transfer Sense Amplifier," S. Patil, M. Wieckowski and M. Margala, 2007 IEEE International Symposium on Circuits and Systems, New Orleans, LA, Jul. 2007, pp. 3030-3033.
"Stray-insensitive switched-capacitor sample-delay-hold buffers for video frequency applications," J. J. F. Rijns and H. Wallinga, Electronics Letters, vol. 27, No. 8, pp. 639-640, Apr. 11, 1991.
"A study of BEOL resistance mismatch in double patterning process," S. Yao, L. Clevenger and N. Zamdmer, 2015 IEEE International Interconnect Technology Conference and 2015 IEEE Materials for Advanced Metallization Conference (IITC/MAM), Grenoble, Feb. 2015, pp. 147-150.
"Mismatch characterisation of chip interconnect resistance," J. Deveugele, Libin Yao, M. Steyaert and W. Sansen, Proceedings of the 2005 International Conference on Microelectronic Test Structures, Apr. 2005, pp. 183-186.
"Mismatch and parasitics limits in capacitors-based SAR ADCs," Y. Zhang, E. Bonizzoni and F. Maloberti, 2016 IEEE International Conference on Electronics, Circuits and Systems (ICECS), Monte Carlo, Jun. 2016, pp. 33-36.
"Common-Centroid Capacitor Layout Generation Considering Device Matching and Parasitic Minimization," M. P. Lin, Y. He, V. W. Hsiao, R. Chang and S. Lee, IEEE Transactions on Computer-Aided Design of Integrated Circuits and Systems, vol. 32, No. 7, pp. 991-1002, Jul. 2013.
B. Razavi, "The Current-Steering DAC [A Circuit for All Seasons]," IEEE Solid-State Circuits Magazine, vol. 10, No. 1, pp. 11-15, Jan. 31, 2018.
"Layout of analog and mixed analog-digital circuits," Design of analog-digital VLSI circuits for telecommunications and signal processing, Jan. 1994, Franco Maloberti, pp. 341-367.
"The art of analog layout", A. Hastings, Prentice Hall, 2000, 172 pages.
"Zero-skew-clock algorithms for high performance system on a chip," Yen-Tax Lai, Yung-Chuan Jiang and Cheng-Hsiung Tsai, Proc. 2004 IEEE Asia-Pacific Conference on Circuits and Systems, Tainan, Dec. 6, 2004, pp. 169-172.
"CMOS IC layout", D. Clein, Newnes, 2000, 282 pages.
"16.2 A 4x Interleaved 10GS/s 8b Time-Domain ADC with 16x Interpolation-Based Inter-Stage Gain Achieving >37.5dB SNDR at 18GHz Input," M. Zhang, Y. Zhu, C. Chan and R. P. Martins, 2020 IEEE International Solid-State Circuits Conference—(ISSCC), San Francisco, CA, USA, Feb. 16, 2020, pp. 252-254.

* cited by examiner

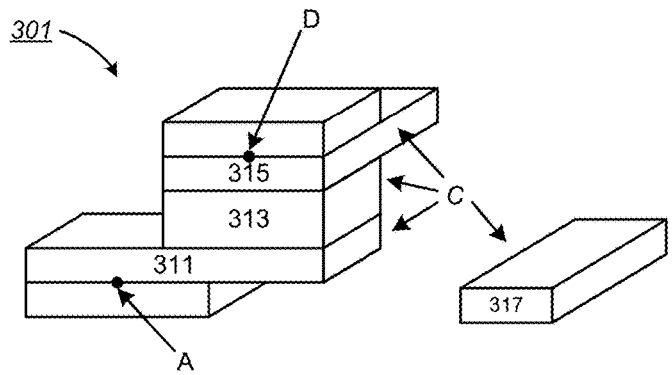

```
DEFINE T; FN{NET A-D};
RETRIEVE PERTINENT PARASITICS
CALCULATE CIRCUIT DESIGN CHARACTERISTIC AT OBSERVATION PT.(S)
    CALCULATE SENSITIVIES
```

$\partial T / \partial R_{311\text{-}313}$ $\partial T / \partial L_{311\text{-}313}$ $\partial T / \partial K_{311\text{-}313}$ $\partial T / \partial R_{313\text{-}315}$ $\partial T / \partial L_{313\text{-}315}$ $\partial T / \partial K_{313\text{-}315}$ $\partial T / \partial C_{311\text{-}317}$ $\partial T / \partial R_{311\text{-}317}$ $\partial T / \partial L_{311\text{-}317}$ $\partial T / \partial K_{311\text{-}317}$ $\partial T / \partial C_{313\text{-}317}$ $\partial T / \partial R_{313\text{-}317}$ $\partial T / \partial L_{313\text{-}317}$ $\partial T / \partial K_{313\text{-}317}$ $\partial T / \partial C_{315\text{-}317}$ $\partial T / \partial R_{315\text{-}317}$ $\partial T / \partial L_{315\text{-}317}$ $\partial T / \partial K_{315\text{-}317}$ o o o

| Layer | Res [Ohm] | Res_perc [%] | Res_cum [%] | R_via_up [Ohm] | via_up [#] | R_via_down [Ohm] | via_down [#] |
|---|---|---|---|---|---|---|---|
| M2 | 101.57 | 27.447 | 27.447 | 0 | | 0 | |
| VIA2 | 85.441 | 23.088 | 50.535 | 36.468 | 61 | 48.973 | 26 |
| ncont | 61.561 | 16.635 | 67.17 | 61.561 | 3 | 2.4112e-15 | 357 |
| M3 | 48.326 | 13.059 | 80.229 | 0 | | 0 | |
| VIA0_1 | 20.8 | 5.6207 | 85.85 | 20.8 | 1 | 4.0275e-15 | 119 |
| M5 | 19.656 | 5.3115 | 91.162 | 0 | | 0 | |
| VIA1 | 12.495 | 3.3765 | 94.538 | 12.495 | 1 | 6.9593e-15 | 59 |
| M0_1 | 8.1949 | 2.2145 | 96.752 | 0 | | 0 | |
| VIA3 | 3.6593 | 0.98883 | 97.741 | 3.6592 | 3 | 1.5691e-05 | 1 |
| VIA5 | 2.6845 | 0.72542 | 98.467 | 0 | | 2.6845 | 4 |
| VIA4 | 2.644 | 0.71448 | 99.181 | 0.011539 | 2 | 2.6325 | 6 |
| M6 | 2.0941 | 0.56587 | 99.747 | 0 | | 0 | |
| M1 | 0.85562 | 0.23121 | 99.978 | 0 | | 0 | |
| M4 | 0.079175 | 0.021395 | 100 | 0 | | 0 | |
| ndiff | 0.0012867 | 0.0003477 | 100 | 0 | | 0 | |
| M0_2 | 6.5397e-18 | 1.7672e-18 | 100 | 0 | | 0 | |
| Total | 370.06 | 100 | 100 | | | | |

411

| Layer | Delay [s] | Delay_perc [%] | Delay_perc_cum [%] |
|---|---|---|---|
| M2 | 7.3392e-13 | 32.129 | 32.129 |
| VIA2 | 6.7548e-13 | 29.571 | 61.7 |
| ncont | 3.409e-13 | 14.924 | 76.624 |
| M3 | 2.8531e-13 | 12.49 | 89.114 |
| VIA0_1 | 7.8215e-14 | 3.4241 | 92.538 |
| M5 | 6.1842e-14 | 2.7073 | 95.246 |
| VIA1 | 5.2272e-14 | 2.2883 | 97.534 |
| M0_1 | 4.0138e-14 | 1.7572 | 99.291 |
| VIA3 | 5.1724e-15 | 0.22644 | 99.518 |
| VIA5 | 4.7904e-15 | 0.20971 | 99.727 |
| VIA4 | 3.4465e-15 | 0.15088 | 99.878 |
| M6 | 1.362e-15 | 0.059624 | 99.938 |
| M1 | 1.2349e-15 | 0.054062 | 99.992 |
| M4 | 1.854e-16 | 0.0081164 | 100 |
| ndiff | 2.3342e-20 | 1.0219e-06 | 100 |
| M0_2 | 2.4185e-42 | 1.0588e-28 | 100 |
| Total | 2.2843e-12 | 100 | 100 |

| Net | Delay [s] | Delay_perc [%] | Delay_cum [%] |
|---|---|---|---|
| 0 | 1.7701e-12 | 77.491 | 77.491 |
| vdacp | 4.4517e-13 | 19.488 | 96.98 |
| clks | 5.7162e-14 | 2.5024 | 99.482 |
| vdacn | 1.1834e-14 | 0.51804 | 100 |
| Total | 2.2843e-12 | 100 | 100 |

| Layer | Delay [s] | Delay_perc [%] | Delay_cum [%] |
|---|---|---|---|
| ndiff | 8.0854e-13 | 35.396 | 35.396 |
| M0_1 | 5.7707e-13 | 25.263 | 60.659 |
| M2 | 2.7557e-13 | 12.064 | 72.722 |
| M1 | 2.369e-13 | 10.371 | 83.093 |
| M0_2 | 2.096e-13 | 9.176 | 92.269 |
| M3 | 1.6746e-13 | 7.3312 | 99.6 |
| M4 | 8.1268e-15 | 0.35577 | 99.956 |
| M5 | 9.3929e-16 | 0.04112 | 99.997 |
| M6 | 6.1733e-17 | 0.0027025 | 100 |
| Total | 2.2843e-12 | 100 | 100 |

FIG. 5B

CIRCUIT DESIGN/LAYOUT ASSISTANCE BASED ON SENSITIVITIES TO PARASITICS

CROSS-REFERENCE TO RELATED APPLICATIONS

This disclosure claims priority to U.S. Provisional Patent Application No. 62/682,743, filed on Jun. 8, 2018 on behalf of first-named inventor Maxim Ershov for "Sensitivity-Based IC Design Analysis and Optimization," and to U.S. Provisional Patent Application No. 62/682,748, filed on Jun. 8, 2018 on behalf of first-named inventor Maxim Ershov for "Software System for Verification of Matching Nets and Matching Devices in Integrated Circuit." Each of these prior patent applications is hereby incorporated by reference.

BACKGROUND

On-chip interconnects and their parasitics are playing increasingly important role in functionality, performance, robustness, and reliability of integrated circuits. Unintended and undesirable effects of parasitic elements lead to post-layout simulations being very different from schematic simulations, and to circuits not reaching their specification requirements.

"Parasitics" or "parasitic elements" generally refer to unintended impedances that degrade electronic circuit performance. The ways in which interconnects of a circuit are laid out and the materials associated with that layout can give rise to unintended resistances, capacitances and inductances that delay signals, induce noise, lead to IR voltage drop and current density (electromigration) violations, cause net and device mismatch, and create other effects that are detrimental to circuit operation. In modern semiconductor technologies, the number of parasitics can be huge, and can exceed the number of design elements (such as transistors) by many orders of magnitude. These parasitics are typically not fully accounted for during initial circuit design, and even when they are, there generally are no optimization tools or methodologies that permit a designer to pinpoint bottlenecks or select an appropriate mitigation or optimization strategy.

What are needed are techniques for addressing these difficulties, that is, for improvements in circuit design tools which provide analysis and visualization of parasitics and facilitate their modification during the circuit design/layout process; ideally, such a design tool would link parasitics to specific physical elements and shapes in the circuit layout and permit a designer to identify and remove/reduce key parasitics as an interactive part of the circuit design/layout process. The present invention satisfies these needs and thus provides an improvement in the functioning of automated or computer-assisted layout and/or analysis tools.

BRIEF DESCRIPTION OF THE DRAWINGS

The patent or application file contains at least one drawing executed in color. Copies of this patent or patent application publication with color drawing(s) will be provided by the US Patent and Trademark Office upon request and payment of the necessary fee.

FIG. 3A is an illustrative 3D diagram of a hypothetical circuit design. Layers 311, 313 and 315 represent part of a circuit path extending between a first node "A" and a second node "D," while layer 317 represents a close-by pathway.

FIG. 3B is a screenshot showing sensitivity computation for a given circuit design characteristic "7" for the structure depicted in FIG. 3A. Each parasitic element affecting a net of interest is identified, these parasitic elements are then processed to identify a value for the design characteristic of interest; sensitivity of this value to subsets of the parasitic elements (e.g., each individual parasitic elements, or for example, a group of parasitics linked to a given structure) is then computed. This provides a tool enabling a designer to quantify the importance of various parasitic elements for the design characteristic.

FIG. 4A is a screenshot showing sensitivity of overall path resistance to individual layers (or contributions of individual layers to the total resistance) for a particular electronic circuit.

FIG. 4B is a screenshot showing sensitivity of RC delay to layer resistances for the circuit represented by the screenshot of FIG. 4A.

FIG. 5A is a screenshot showing sensitivity of RC delay to coupling capacitances to other nets.

FIG. 5B is a screenshot showing sensitivity of RC delay to coupling capacitances associated with various individual layers.

Figure 1:
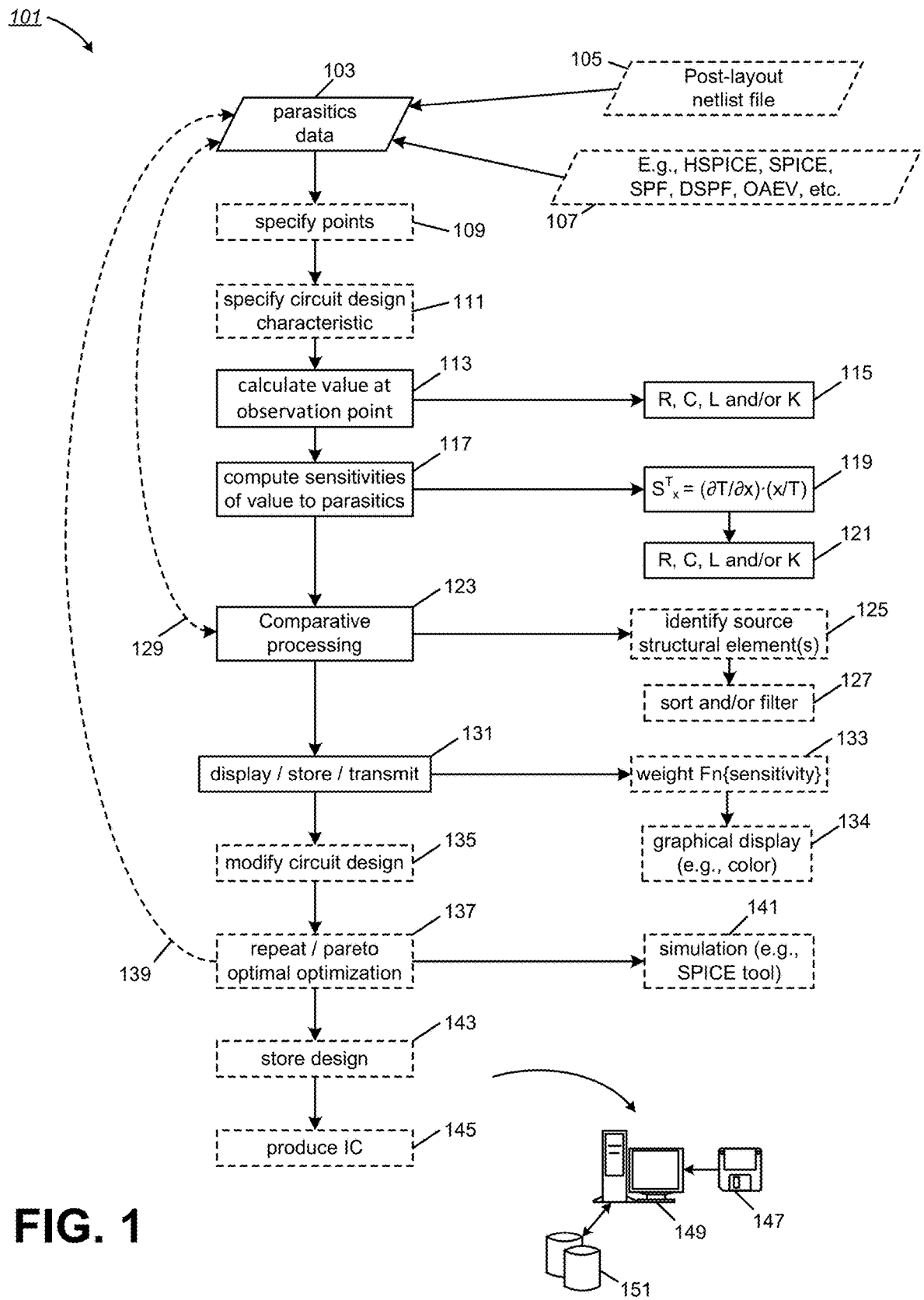
FIG. 1 is a block diagram showing one embodiment of techniques for assisting with circuit design and analysis based sensitivity to parasitic elements.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques that can be used to improve the functioning of automated or computer-assisted circuit design, analysis and/or layout tools, and to speed up effective circuit design and debugging. The various techniques can be embodied as software, in the form of a computer, device, service, cloud service, system or other device or apparatus, in the form of a circuit design or layout file produced or modified as a result of these techniques, or in another manner. While specific examples are presented, the principles described herein may also be applied to other methods, devices and systems as well.

DETAILED DESCRIPTION

This disclosure provides techniques for addressing the aforementioned problems by receiving and processing parasitic elements for a given electronic circuit design. The parasitic elements (or "parasitics") typically are identified from a post-layout netlist (or are extracted from a layout of a given electronic circuit design (i.e., a specific integration design) and will vary as individual layers (e.g., device stack layers, conductive traces, vias, interconnects, and other structures) are moved/changed in three-dimensions, as well as in a manner dependent on materials used (including any separating dielectrics) and other factors. Note that standardized expressions exist for expressing a post-layout netlist, including without limitation the Standard Parasitic Format (SPF), the Detailed Standard Parasitic Format (DSPF), the Standard Parasitic Exchange Format (SPEF), Open Access (OA) extracted view, SPICE netlist, and other formats. In one embodiment, parasitics are broken down to as fine a granularity as possible, and to this end, a DSPF format can be advantageously used (or generated if not readily available); however, it is also possible to apply techniques disclosed herein to other parasitic expression formats including without limitation those referenced above. Digital values provided by these formats can represent one or more conventional types of parasitic values including by way of example, resistances, capacitances, and inductances (mutual- or self-inductances) expressed in some unit of measure; in some implementations, the parasitic elements can be of mixed types. The disclosed techniques operate on these parasitics by determining how they affect a given circuit design characteristic for one or more paths of interest (e.g., one or more "nets" or "blocks"), and to derive sensitivities of that circuit design characteristic to each individual parasitic (or any desired grouping of parasitics). As an introductory example, should a particular conductive trace in a hypothetical circuit design give rise to a coupling capacitance, the disclosed techniques might be applied by a circuit analysis tool to understand RC delay, by (a) identifying one or more nets representing the trace, (b) identifying which parasitic elements from a post-layout netlist (e.g., a subset of the parasitic elements for an entire IC design) are pertinent to parasitic capacitance and/or parasitic resistance for the identified nets, (c) processing those identified parasitics to understand overall RC delay affecting the identified nets, (d) calculating sensitivities, i.e., a figure of merit which identifies the contribution of each individual parasitic element (or any desired grouping of parasitic elements which meaningfully contribute to that overall RC delay, and (e) storing or displaying a result that enables a designer to understand relative contribution of each parasitic element or layout structural element to RC delay; this then permits a designer to immediately evaluate a design and rectify issues (e.g., by moving a specific via that causes RC delay to be excessively large). Exemplifying further, in one embodiment, these techniques can be applied to generate an output that permits a designer to interactively redesign structural elements (e.g., by moving or resizing those elements, or by changing related material properties) and to visualize in real-time how this adjustment (and its associated change to the stray capacitance) incrementally affects the parameter of interest. The results of the parasitics' analysis contemplated by this disclosure can be visually rendered, stored for future use, or provided to circuit design/layout software to apply modifications to design/layout so as to adjust circuit design/layout to meet the design requirements of a given specification. As should be appreciated therefore, the disclosed techniques provide a general class of operations and capabilities that are typically not provided by conventional layout, design and/or simulation software, and they provide a tool for a designer or layout engineer to much more easily identify, understand and correct the effects of undesired parasitics in any given circuit design/layout.

In one embodiment, the techniques disclosed herein can be implemented as a processor-implemented method. For a given electronic circuit design, one or more processors receive a post-layout netlist representing the actual geometry and materials of a given electronic circuit design. The one or more processors then obtain a specification of one or more excitation points and one or more observation points in this design; these points can be nodes within the design, the entire design itself, or indeed, any points that are to be measured. In one embodiment, these points can be selected or inferred by default by a given design tool. These points represent one or more nets that are to be evaluated. The one or more processors also receive a specification of a given circuit design characteristic, i.e., any parameter or measure of a circuit that is to be understood, for example, RC delay, total resistance, total capacitance, impulse response, a signal delay time, a transfer function, a channel bandwidth, a voltage drop, a current density, transient characteristics, and potentially many other types of circuit performance parameters and/or any other desired characteristic. The one or more processors use these various pieces of information to select a set of parasitic elements from the post-layout netlist which will be needed to compute a value for the design characteristic. For example, a designer working on a very large scale integration (VLSI) project can specify a limited segment of a given VLSI circuit simply by specifying two particular points of interest, for example, a particular input pin (e.g., "DQ0") and a connection to a receiver, and that the designer wishes to understand RC delay affecting this path; the input pin in this example would be an excitation point and the connection to the receiver would be an observation point, i.e., at which a delay is to be measured relative to introduction of a signal at the excitation point. There can be more than one excitation point and more than one observation point. Given that RC delay is the design characteristic to be measured or simulated between these various points, the one or more processors might retrieve a post-layout netlist for the LSI or VLSI project and extract just those parasitic elements needed to compute RC delay for the path (or "net") of interest. For example, a post-layout netlist for a VLSI project might consist of many millions of individual parasitics (e.g., digital values representing individual parasitics), and the at least one processor in this example might extract just a relatively small set representing capacitances and resistances affecting the path from pin "DQO" to the connection of the receiver of interest, and any connected nets. If no post-layout netlist is available, then one is extracted (e.g., from a design file). Note that this parasitics can include both series and parallel elements. In the context of standards parasitics representations (such as DSPF), nets can be used to define parasitics for lumped or distributed interconnects; the excitation and observation points specified can be defined to as to encompass one or more discrete nets represented by a standards parasitics representation format (e.g., DPSF), but this also is, strictly speaking, not required, and any set of excitation and observation points can potentially be specified. The one or more processors then receive digital values identifying parasitic elements pertinent to the design characteristic and net of interest and process these values so as to compute a value for the design characteristic of interest, for example, overall RC delay at a given observation point. Note that in one embodiment, this computation can performed on a linear matrix solver (or linear SPICE simulator), as contrasted with a nonlinear SPICE simulation; in another embodiment, design characteristic values can be simulated or measured (e.g., a simulator such as a SPICE tool can be used to measure the design characteristic of interest, e.g., called as a subroutine function, or another tool or module can be invoked). Whichever method is used for calculation, measurement and/or modeling, against the computed value for the selected or inferred design characteristic of interest, the method then calculates the incremental effect of each parasitic (or a group of parasitics associated with a given structure or layer) on that computed value for the inferred or specified net(s). Again citing a hypothetical example, the transformed data from these processing steps might indicate that a particular structural element (or particular layer and/or parasitic) has a disproportionate impact on signal delay between the two nodes specified by a designer—this data can be formatted and stored, and/or presented to a designer so as to effectively suggest an optimization strategy and/or to assist layout revision (such as by triggering automatically redesign of the layout so as to achieve a pareto optimal result). As should be understood, these techniques can be embodied in (e.g., integrated with) conventional circuit design and/or simulation tools (e.g., such as with SPICE or other circuit simulator programs or other programs for integrated circuit layout, analysis or design).

In other embodiments, techniques similar to those just introduced can be embodied as instructions stored on non-transitory machine-readable media which, when read by a machine and applied to control one or more processors, will cause those one or more processors to operate in the manner just described. Other contemplated embodiments include as a machine or system (e.g., one or more computers configured for circuit layout design analysis and optimization), as a software module or suite included as part of a circuit design software system (e.g., with SPICE or other layout/design/analysis and/or simulation software), as a stored repository of parasitics' sensitivity data, produced in the manner described herein, or in some other form.

As should be apparent from the foregoing description, the various techniques introduced above can be used to improve the operation and processing of electronic design automation (EDA) software and related systems. By providing ability to visualize the proportional impact that each parasitic has on the performance of a larger circuit, the techniques presented by this disclosure help streamline the identification of circuit design problems and their associated mitigation during the layout process.

With various system elements thus introduced, this description will now proceed to describe the various figures ("FIGS.") and provide additional detail concerning various specific embodiments. Generally speaking, it is specifically intended that any of the cited structures, operations, algorithms, features, use models, applications or operands ("elements") can be mixed and matched, and included or omitted in any combination or permutation as desired or as pertinent to the particular application; that is to say, while several specific detailed examples discussed herein feature specific combinations of certain elements, it is generally contemplated that inclusion of any these elements are optional relative to one another and can be combined in any manner suitable or appropriate to a specific design.

Note that several terms used herein should be introduced. First, "circuitry" can refer to analog or digital electronic elements (e.g., dedicated logic gates), either arranged as special purpose circuitry that necessarily performs a certain function when electrically motivated, or as general purpose circuitry (e.g., a processor) that is controlled or otherwise configured by instructions (software) so as to adapt that circuitry to perform a specific function and cause that circuitry to operate as though it was special purpose circuitry. "Processor" as used herein refers to a set of configurable hardware circuit elements or hardware circuit elements that can be controlled to perform any one of a number of different functions including, without limitation, an FPGA, microprocessor, microcontroller, whether or not embodied in a standalone die or as a discrete integrated circuit. "Instructions" and "software" typically refer to instructional logic for configuring and/or controlling operation of a processor. Such instructions are typically written or designed in a manner that has certain architectural features such that, when those instructions are ultimately executed, they cause the one or more general purpose circuits or hardware devices (e.g., one or more processors) to necessarily perform certain described tasks. "Logic" can refer to software logic (i.e., instructional logic) or hardware logic (e.g., a digital chip or board design) or a combination of these things. "Non-transitory machine-readable media" means any tangible (i.e., physical) storage medium, irrespective of how data on that medium is stored, including without limitation, random access memory, hard disk memory, optical memory, a floppy disk or CD, server storage, volatile memory, memory card and/or other tangible mechanisms where instructions may subsequently be retrieved by a machine (such as one or more processors). The machine-readable media can be in stand-alone form (e.g., a program disk, solid state memory card, whether bootable or executable or otherwise, or in other memory) or embodied as part of a larger mechanism, for example, a laptop computer, portable or mobile device, server, data center, "blade" device, subsystem, electronics "card," storage device, network, or other set of one or more other forms of devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or common circuits, or by different processors or circuits, depending on embodiment. For example, "instructions stored on non-transitory machine-readable media" typically refers to software stored on disk or in other physical memory or storage, where the software is structured such that when it is later (ultimately) installed or executed by an operator or end user, it configures a machine (e.g., one or more processors) so that they operate in a prescribed manner. In one implementation, instructions on non-transitory machine-readable media can be executed by a single computer or processor and, in other cases as stated, can be stored and/or executed on a distributed basis, e.g., using one or more servers, clients, or application-specific devices, whether collocated or remote from each other. Each function mentioned in the disclosure or FIGS. can be implemented as part of a combined program or as a standalone software module (i.e., an invocable or callable program or subroutine), either stored together on a single media expression (e.g., single floppy disk) or on multiple, separate storage devices, or in the form of dedicated circuitry or circuitry combined with such software. Throughout this disclosure, various processes will be described, any of which can generally be implemented as instructional logic (e.g., as instructions stored on non-transitory machine-readable media), as hardware logic, or as a combination of these things, depending on embodiment or specific design. A circuit design, or schematic, as used herein generally refers to a generalized description of how component structures in an electronic circuit should be connected together. In the process of circuit design, a schematic is then laid out in a manner such that two-dimensional (2D) pathways are geometrically positioned relative to one-another. A circuit description is then extracted as a netlist which takes into account precise materials, dielectrics, 3D dimensioning, and other factors, and models the entire circuit design as a netlist, i.e., a list of connected nets. A "net" is simply a set of electrically-connected structures, and a netlist is a list that lists the various nets of an electronic circuit and describes how they are connected. Some, but not all netlist formats, will contain a description of parasitic elements created by the particular design, e.g., given characteristics of the various metal layers, vias, dielectrics and device instances that make up a particular design. A "node" as used herein refers to any type of specified "point" in a circuit design (e.g., whether or not such serves as a junction between two elements or signal paths). A "structural element" as used herein refers to any physical structure or hierarchy of physical structures in a given circuit design, for example, an individual parasitic (e.g., that might be expressed as an incremental resistance for just a small part of a circuit trace), a group of parasitics (e.g., lumped RC effects attributable to a given polygon or layer), or indeed, any part of a circuit design (e.g., a via, a layer, a group of layers, and so forth). "Module" as used herein refers to a structure dedicated to a specific function; for example, a "first module" to perform a first specific function and a "second module" to perform a second specific function, when used in the context of instructions (e.g., computer code), refer to mutually-exclusive code sets; these code sets can be embodied as different code portions (e.g., different sets of lines in a common-program) or respective standalone routines, programs or files. When used in the context of mechanical or electromechanical structures (e.g., a "sensor module"), the term module can refer to a dedicated set of components which might include hardware as well as software); for example, an "encryption module" and a "network registration module" would refer to dedicated, mutually exclusive components for performing tasks of encryption and network registration, respectively, and they might be discrete code sets or have discrete mechanical structures, or both, depending on context. In all cases, the term "module" is used to refer to a specific structure for performing a function or operation that would be understood by one of ordinary skill in the art to which the subject matter pertains as a conventional structure used in the specific art (e.g., as a software module or hardware module as those terms would be understood in the context of computer and/or software engineering and/or circuit integration), and not as a generic placeholder or "means" for "any structure whatsoever" (e.g., "a team of oxen") for performing a recited function (e.g., "encryption of a signal"). "Electronic" when used to refer to a method of communication can also include audible, optical or other communication functions, e.g., in one embodiment, electronic transmission can encompass optical transmission of information (e.g., via an imaged, 2D bar code), which is digitized by a camera or sensor array, converted to an electronic digital signal, and then exchanged electronically. Generally speaking, reference will be made herein to instructions such as computer code which, "when executed," cause one or more processors to perform a specific task; this usage should be interpreted as referring to the intended design and operation of software (e.g., such as might, following software sale and/or distribution, be installed and executed by a software licensee or an end-user).

FIG. 1 is a block diagram showing one embodiment of techniques for assisting with circuit design based on parameter sensitivity to individual subsets of parasitic elements. As part of a method generally represented by numeral 101, a computer (or other collection of one or more processors) first receives parasitics' data 103 for a specific circuit design as laid out. As indicated by block 105, this data is optionally extracted from a post-layout netlist file 105. As alluded to previously, such a layout file typically contains detail identifying interrelationships between conductive traces and circuit components (such as structures and dielectrics) that will be used to configure or replicate (e.g., mass-produce) a given design for a particular type of electronic circuit; conventionally, such a file might include specifics on feature height, width and length expressed in a coordinate system, and the associated parasitics' information typically contains information about unintended capacitances, inductances and resistances that will be created by the specific circuit design (i.e., as laid out). The parasitics' information can be extracted from the layout file using a custom process or using a well-known extraction tool (e.g., "StarRC" from Synopsis, Inc., "Quantus QRC" from Cadence Design Systems, Inc., and other similar products). As indicated by numeral 107, in one embodiment, the parasitics' information can be directly loaded from a standard netlist format, for example, loaded directly from a DSPF, SPF, SPEF, OA, HSPICE, SPICE, or another file format for expressing parasitics. Note that the parasitics' information typically expresses unintended electrical elements, as digital values with a specifically defined or understood unit of measure, for example, Ohms, Farads, Henries, or another unit of measure, or unitless—such as the coupling coefficient for mutual inductance; because these elements are parasitic, these values only have context in a given electronic circuit footprint or extracted layout (e.g., a layout for an integrated circuit).

As indicated by numeral 109, software optionally prompts a designer to specify one or more excitation points and one or more observation points, so as to effectively identify any nets of interest, against which novel parasitics analysis techniques will be applied. The net or nets selected by the designer can for example be expressed as two specific points within a net defined in a post-layout netlist, spanning multiple nets defined in any such netlist, or on a net within a cell or larger feature of a large scale integration (LSI) or very large scale integration (VLSI) project, including the entire design itself; note again that the excitation and/or observation point(s) can be inferred depending on embodiment, e.g., a defined input and output (e.g., a connection between specific pins or a specific path such as an interconnect) can serve as a default operand depending on embodiment. As indicated by numeral 111, software also optionally prompts a designer to specify a circuit design characteristic of interest (i.e., an operating parameter against which the operation of the specific net or nets is to be evaluated). This circuit design characteristic ("T") can be resistance from one node on a net to another, delay along a signal path, 3 dB bandwidth of a high-speed channel, IR drop value, current density value, PLL oscillation frequency, or any other DC, small-signal AC, or transient characteristic that is to be simulated, measured or modeled (including without limitation those parameters referenced earlier). In one embodiment, the circuit design characteristic can be inferred by the system (e.g., signal delay time might be the modeled parameter, for example, as an invocable function/call out for a circuit simulation software program).

Note that as contrasted with a conventional circuit representation (e.g., a conventional schematic representation for a given type of electronic circuit), which might describe the general, layout-agnostic way in which circuit components are connected, such as transistors, the post-layout netlist file of FIG. 1 typically models a specific layout as a network of distributed resistors, capacitors and/or inductors an their interconnection and routing as having specific arrangement, routing, materials, geometries, resistances, dielectric constants and so forth; that is to say, each parasitic is typically modeled by the post-layout netlist file as an independent dedicated structure. As indicated by reference numeral 113, however, the embodiment of FIG. 1 proceeds to process these parasitics in a manner that has context (1) for the specific circuit design parameter that is to be assessed, and (b) for the net or nets that are under analysis (e.g., for specific excitation and observation points selected by a designer, and any other relevant, connected nets, per function block 109). The method is thus able to calculate a value for the circuit design characteristic of interest based on solving or simulating any needed impedance models and given any starting or boundary conditions pertinent to the circuit design characteristic. For example, to calculate total resistance, the method might (depending on embodiment) apply matrix operators and solve Kirchhoffs equation for current flow given suitable boundary conditions (signals applied to excitation points). If instead the circuit design characteristic of interest is "signal delay" and the path of interest extends from node "A" to node "D," step 113 is performed to permit the system to calculate aggregate delay for the specified net or nets path as a function of the all pertinent RC parasitics affecting the specified net or nets. "Pertinent parasitics" in this context can either be the set of all parasitics potentially having any effect on the selected pathway, or can represent a filtered set (e.g., any parasitics falling below a certain value can be disregarded), depending on specific implementation. As denoted by numeral 115, depending on embodiment, resistance (R), capacitance (C), self-inductance (L), mutual inductance (K), or any combination of these parasitics can be considered/modeled, depending on implementation. In some embodiments, elements representing parts external to net, such as intended elements or characteristics (driver resistance, load capacitances, etc.), package or printed circuit board parasitics (such as bond wires resistance or inductance), or other things, can optionally be included in the analysis.

The method then proceeds to compute sensitivity of the circuit design characteristic of interest (e.g., signal delay) as a function of each individual parasitic element which was identified as pertinent, per numeral 117. Again, depending on embodiment, only a subset of these parasitic elements can be modeled (e.g., it might be presumed for a given software design that a designer will not wish to view sensitivities of a parameter to stray capacitances that account for less than 1% of the aggregated total capacitance); in yet another embodiment, as discussed below, software can optionally receive an input from the designer which supplies a dynamic threshold, either before individual sensitivities are calculated, or as a filtering step for the post-calculation output provided by a display or stored file.

Sensitivity analysis is conventionally sometimes used in the field of circuit design to assess the impact of specific standard cell or intended device variations on an overall design, for example, by considering the process corners associated with delays imposed by a specific transistor in a design upon overall delay of a much longer path that includes that transistor. Such techniques are of limited practical help in evaluating a specific circuit layout extraction and how the individual layers of that layout can be modified to improve operating parameters of an integrated circuit design. With the techniques proposed herein, sensitivities of the circuit design characteristic of interest to respective subsets of one or more parasitic elements are computed; in one embodiment, this is done for each parasitic element that contributed to the whole (i.e., that was used to measure, simulate or model a value for the circuit design parameter of interest for the net or nets of interest), and in other embodiments, this is done for different structural elements (each of which might a modeled as a single parasitic, e.g., a point-to-point resistance) or set of parasitics (e.g., a layer or polygon having multiple associate parasitics). In this regard, sensitivity can be thought of as a figure of merit that measures how the overall calculated, measured or simulated value for the specified circuit design characteristic changes as a function of change in the value of an individual parasitic element (or group of parasitics, e.g., representing a structural element). In one embodiment, this can be expressed as a partial derivative of the circuit design characteristic of interest with respect to the individual parasitic:

$$S_x^T = \frac{\partial T}{\partial x}$$

where "7" is the circuit design characteristic of interest (e.g., signal delay, loop bandwidth, voltage drop, transient response, etc.) and "x" is the specific parasitic of interest, e.g., $R_i$, $C_i$, $L_i$ or $K_{ij}$, where "i" and "1" define the specific parasitic element. The embodiment of FIG. 1 optionally operates based on normalized sensitivities, which can be thought of as, $$S_x^T = \frac{\partial T}{\partial x} \cdot \frac{x}{T},$$

as depicted by function block 119; again, any of R, C, L and/or K can be used as the modeled parasitics, depending on design, as represented by block 121. Note that any type of sensitivity, or sensitivity normalization by geometrical or other parameters (such as parasitic resistor length, width, or area) can be used, whether general or specific.

Figure 6A:
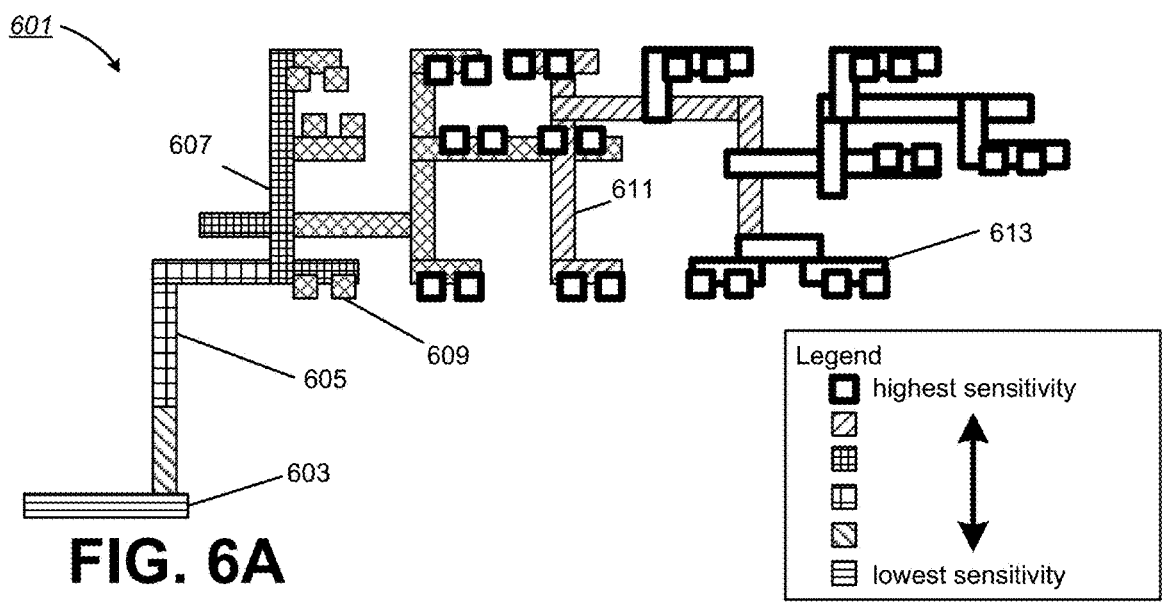
FIG. 6A is a 2D graphical depiction of structural elements that make up a hypothetical net, rendered in a manner that graphically overlays sensitivities (e.g., of the circuit design characteristic being modeled, such as "RC delay") to each individual parasitic. For example, as indicated by a legend in the lower-right corner of FIG. 6A, polygons with a dark (thick) outer line (e.g., structure 613) have a greater proportionate influence on overall RC delay of the circuit path of interest than structures with a thin outer line and simple hatching (e.g., structure 603). A rendering of this type interrelates parasitics' sensitivities to layout and permits a designer to visualize exactly where blocking parasitics might be creating problems for the given layout/design. This may help a designer immediately capture layout mistakes, or understand weaknesses of the contemplated layout.
Figure 6B:
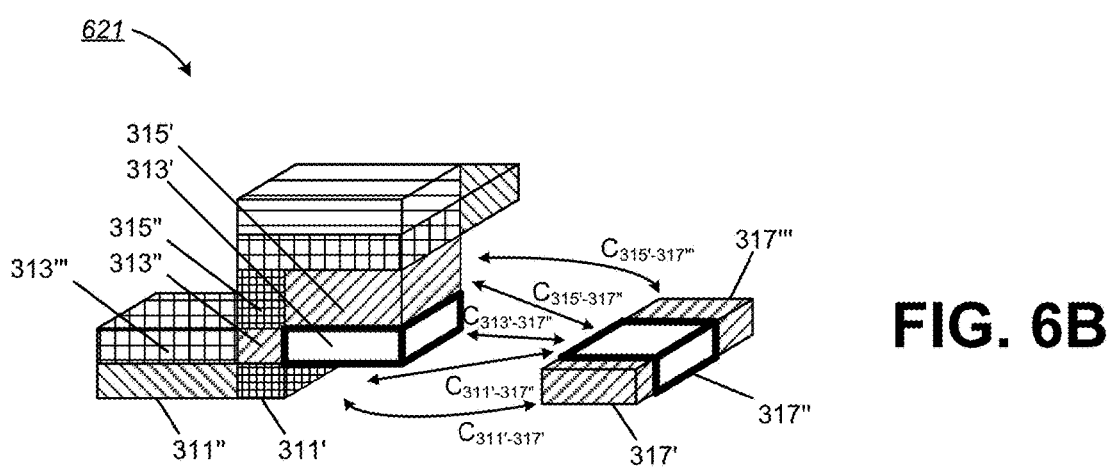
FIG. 6B shows a 3D rendering of structures from FIG. 3A, now overlaid with associated per-parasitic sensitivities of the performance parameter of interest. A designer employing such a 3D visualization, for example, can individually change the 3D layout of individual paths of the depicted circuit (for example, by interactively moving layout of sublayer 317', sublayer 317" and/or sublayer 317''') so as to dynamically reduce the sensitivity of the performance parameter (e.g., RC delay) to individual parasitics (e.g., to "$C_{313'-317'}$"). For example, a designer might interactively move or redesign layer 317 (or any of its sublayers) and observe change in displayed sensitivity of the listed parameter (e.g., RC delay for the depicted path) to associated parasitics.
Figure 7A:
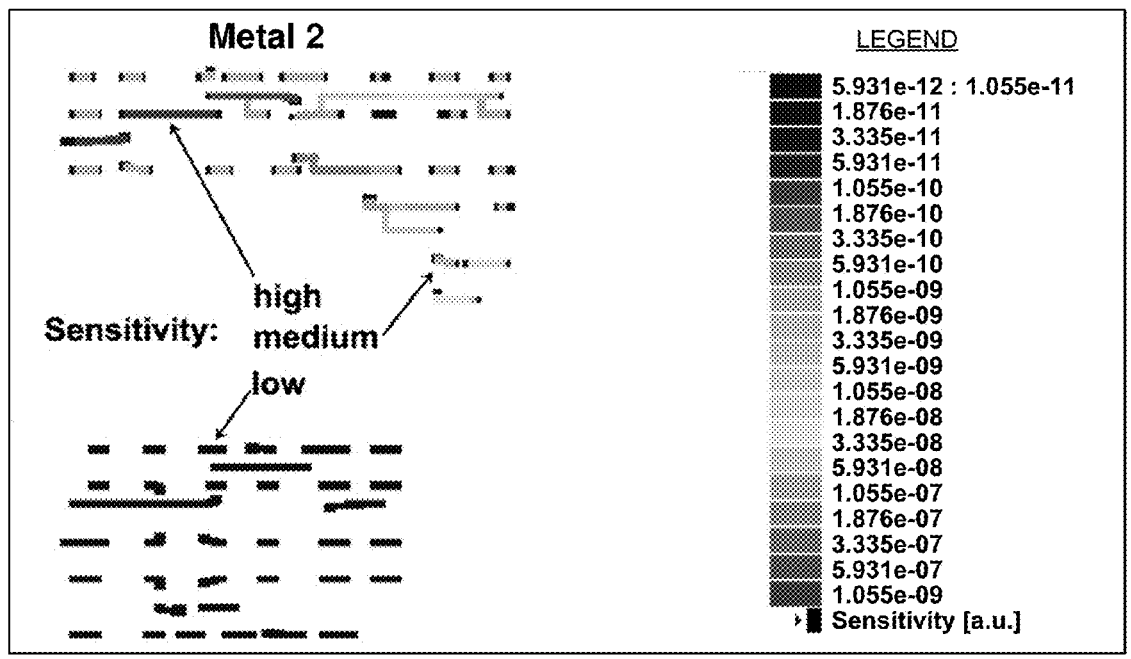
FIG. 7A is another color image of a 2D layout, in this case, where sensitivity has been filtered according to metal layer, in this case, a "metal 2" layer. Value of sensitivity of each polygon (e.g., each structural element or individual parasitic element in a given layer) is indicated by a legend seen at the right of FIG. 7A.
Figure 7B:
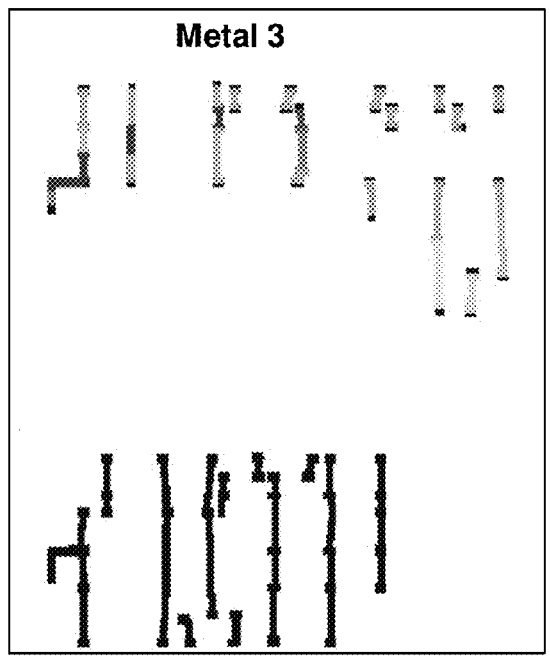
FIG. 7B is another color image of a 2D layout, in this case where sensitivity has been filtered according to different metal layer, in this case, a "metal 3" layer.
Figure 7C:
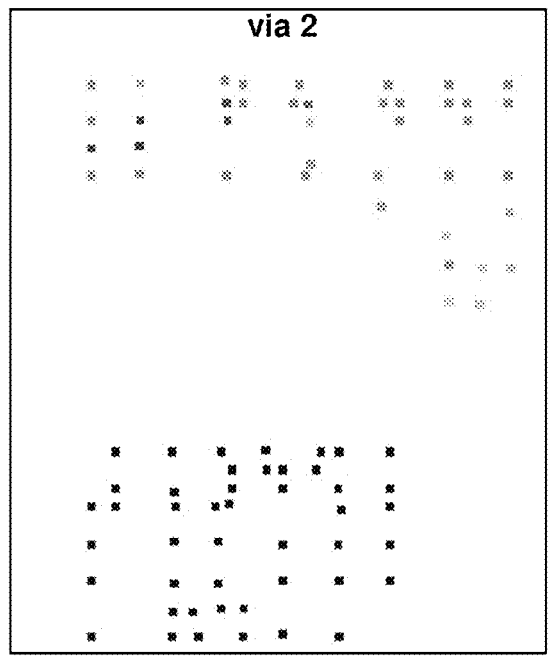
FIG. 7C is another color image of a 2D layout, in this case, where sensitivity has been filtered according to a different metal layer, in this case a "via 2" layer.

The result of this processing is that the parasitics' data which was initially received, e.g., via a post-layout netlist file such as a SPF, DSPF, or OAEV file, or other type of parasitics' expression format is converted to a different form (one which quantifies on a relative basis what role certain parasitics have for a selected net or nets for a selected circuit design characteristic). This data can then be comparatively processed, for example, by listing and sorting structures and/or parasitics in terms of their impact on the overall design, as indicated by block 123. In various implementations, this comparative processing can be expressed in a number of ways, for example, as might be suitable for a particular EDA tool. One contemplated implementation sorts values and assigns colors or a type of weighted-rendering to the individual sensitivity values, and then displays these graphically to the designer (e.g., via a graphical user interface or "GUI" on a computer display screen). Per numeral 125, these values/weightings can optionally be overlaid onto (e.g., combined with) a graphical rendering of the particular circuit geometries of interest, in a manner that visually conveys to the designer the significance of each individual structure (and associated parasitics) to the performance of the particular path (or cell or feature) selected by the designer, for the expressed circuit design characteristic of interest. For example, as will be discussed further below, FIGS. 6A, 7A, 7B and 7C provide examples where a 2D representation of a distributed network of parasitics is color coded (or otherwise graphically weighted) so as to convey where bottlenecks might reside for a particular circuit design characteristic in terms of significant parasitics; FIG. 6B provides an example where sensitivities are graphically overlaid onto a 3D representation of a circuit (e.g., such that a designer can see where parasitics arise from in a 3D sense), and FIGS. 7A-7C provide example 2D views extracted from a 3D representation—in one contemplated variation, the designer can in real time use circuit layout tools to dynamically move structures and/or change net or structure dimensions and/or materials properties, and can immediately visualize the incremental effects of such adjustments in terms of changing (e.g., increasing, decreasing, shifting, or eliminating) bottlenecks created in the pathway of interest for the specified operating parameter. Software also optionally provides the designer with an option to filter and/or sort any of the identified sensitivities or their expression in a graphical rendering (e.g., per numeral 127); to provide a hypothetical example, in one contemplated implementation, software can be structured so as to consider/render sensitivities only meeting a designer-specified threshold impact (e.g., accounting for 1.0% or more) on the parameter under consideration. As implied by arrows 129, the parasitics' data (103) and its links to the post-layout netlist and associated design can be used to tie any identified sensitivities back to associated physical structural elements of the given integration design. The desired type of rendering and/or presentation of relative sensitivities is considered an implementation decision for a given software design tool, e.g., a circuit layout tool might by design provide for a different visualization of sensitivities than might a SPICE tool.

The embodiment of FIG. 1 displays or stores sensitivity data (i.e., or data derived from or based on the sensitivity data) or provides/transmits such data to a layout or design tool for purposes of circuit design, as referenced by numeral 131. In one implementation, an output file having a predetermined format can be created and stored in non-transitory media. In another embodiment, this data can be formatted for display to the designer on a display screen (e.g., for display on a mobile device or other form of computer). In yet another implementation, data can be sent to a destination (for example, via a wide area or local area network) for storage, logging and/or some other type of processing. A variety of actions can also be taken based on generated data, for example, it is possible to generate flags or alerts for computed sensitivities which exceed specified norms (for example, which violate a design constraint dynamically imposed by the designer). In one embodiment, processing can be fully automated with the system specifying that parasitics' sensitivity data is to be automatically computed and a design validated, provided that one or more pre-supplied criteria are not violated (e.g., that a signal delay time for a specified path is not more than "Y" and that this delay time not have more than a 10.0% sensitivity to a particular parasitic); clearly many examples will occur to those having ordinary skill in the art of circuit design or computer design tools. As indicated by numerals 133 and 134, the generated parasitics' sensitivity data can optionally be output in a format that is weighted or adjusted according to sensitivity, and this weighting can optionally be factored into a graphical rendering.

The generated parasitics' sensitivity data can also be applied to perform automated design or automated design modification, per numeral 137. For example, in one embodiment, software tools are designed such that violation of designer-specified criteria triggers redesign/repositioning of one or more structural elements in the integrated circuit as laid out so that those elements do not violate designer-specified criteria. Citing the hypothetical example just used, if one criteria is that a specified path is not to both have a signal delay time of more than "Y" and more than a 10.0% sensitivity to any particular parasitic, violation of this criteria might trigger software to suggest one or more layout revisions that automatically move/re-dimension/reconstitute one or more of the structures associated with offending parasitics so as to reduce signal delay time to less than "Y," or to reduce dependence of this value on any given parasitic, or both. As denoted by function block 137, an architect of a software design tool can permit a designer to specify criteria for pareto optimization, with a designer then being called upon to validate or approve a specific modification proposal. Per numeral 139, a software tool can be designed so as to permit the designer to accept/validate any specific change, such that an electronic design file (and any associated parasitics' file) are then updated by software to reflect the particular change. In one embodiment, re-extraction of a design (e.g., re-computation of parasitics) is dynamically performed for any modifications, permitting a designer to dynamically and/or in real-time observe how dynamic changes in structural elements and/or associated parasitics changes the circuit design characteristic being modeled and/or sensitivity of that circuit design characteristic to the structural element and/or parasitic being dynamically modified. As implied by this statement, the techniques represented by the embodiment of FIG. 1 can be embodied as a standalone piece of software or as a software module that is part of a larger integration layout or analysis tool; per numeral 141, a tool predicated on parasitics' sensitivity analysis can also be integrated with a simulation tool (such as a SPICE or analogous tool).

As should be apparent, a designer employing the techniques represented by FIG. 1 can use the software-provided parasitics' sensitivity data to visualize where a given circuit design creates performance bottlenecks, and can then more easily and interactively modify circuit designs so as to efficiently remove those performance bottlenecks. Per numerals 143 and 145, a modified circuit design (e.g., a post-layout netlist or other circuit representation) can be stored and used as the basis for mass production/configuration of integrated circuits.

Numerals 147, 149 and 151 indicate that the techniques expressed above can be embodied in the form of instructions or software for controlling one or more processors. Briefly, numeral 147 identifies a floppy disk icon, used to denote that these instructions can be stored on non-transitory machine-readable media for execution on a general purpose machine (e.g., a computer) or a distributed set of machines (e.g., more than one computer, and/or more than one processor), represented by numeral 149. As indicated by numeral 151, a main memory such as a magnetic disk memory can be used to store a layout file and/or post-layout netlist file for a LSI or VLSI design, with working files being loaded into local memory (e.g., RAM within computer(s) 149, with any design updates then being committed back into main memory, as needed or appropriate.

Figure 2:
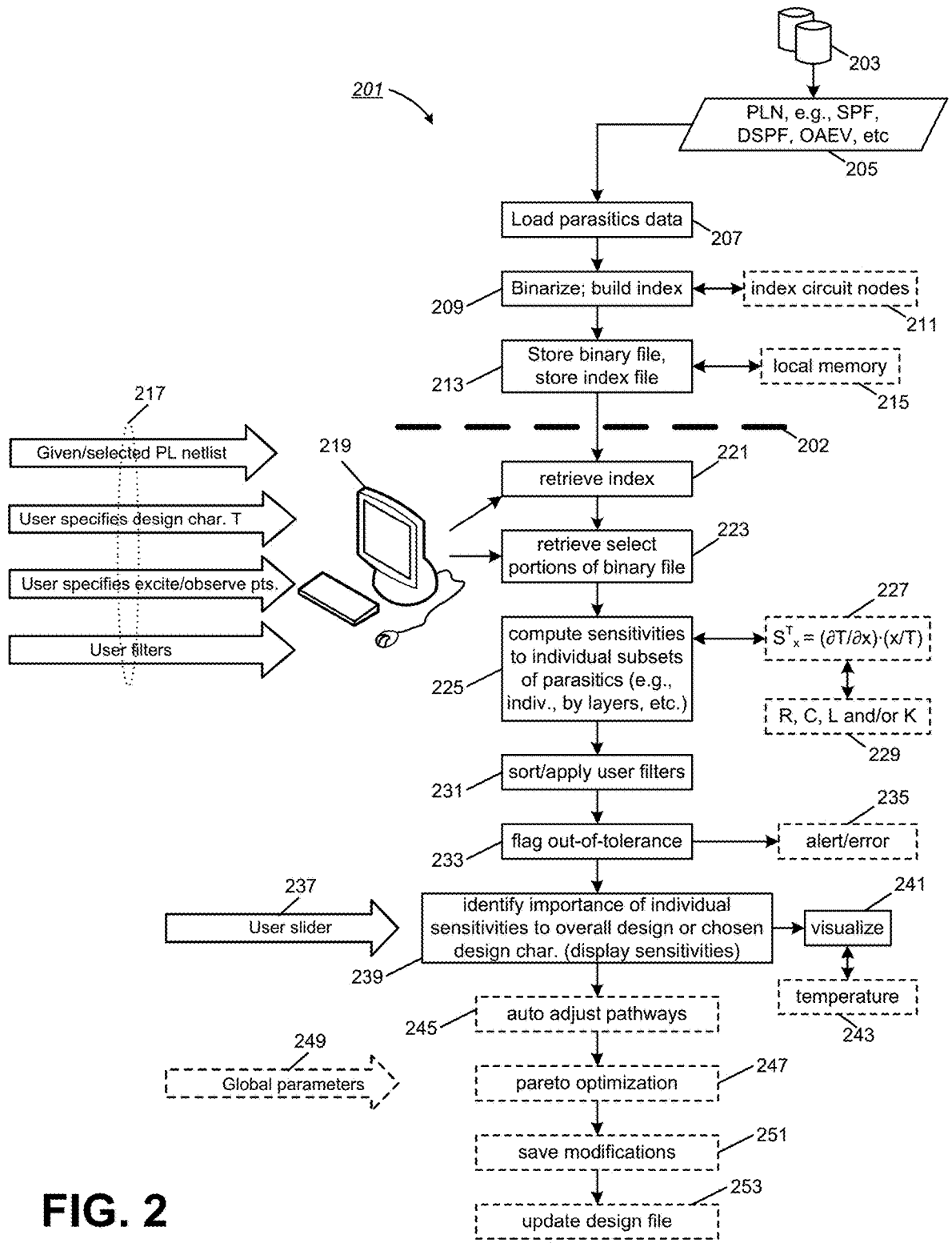
FIG. 2 is a block diagram showing another embodiment of techniques for assisting with circuit design and analysis based sensitivity to parasitic elements.

FIG. 2 is a block diagram showing another embodiment of techniques for assisting with circuit design based on sensitivity to parasitic elements associated with structures which makeup the circuit of interest. These techniques are generally denoted by numeral 201 and may be embodied as a computer- or processor-implemented method, as instructions stored on non-transitory machine-readable (or processor-readable) media, or as design-specific parasitics' sensitivity data produced according to the techniques introduced by this disclosure.

Numeral 203 denotes a main memory, conventionally implemented using magnetic disks; in this embodiment, this memory supplies a post-layout netlist (PLN) file for a given electronic circuit design, for example, expressed using a DSPF, SPF, OAEV or other file structure (per numeral 205). Such a file can be many gigabytes in size or larger depending on the particular circuit design. To illustrate this fact, it should be considered that a small portion of a hypothetical large scale circuit might be an input pin ("DQO") and a conductive trace which extends from the input pin through an electrostatic discharge protection circuit to a connection to a receiver. Expressed in terms of DSPF, a parasitics representation of such a circuit portion might have many dozens-to-hundreds thousands or millions of entries, expressed as part of an interconnection of nets (each a separate section of the DSPF file structure). Each net in the DSPF file would be expressed as a series of ASCII character line-based entries, with individual lines each representing a resistor or capacitor used to model both ideal and non-ideal behavior of the particular of the circuit portion, with input pins, loads and connections to other "nets" represented, and with x-y coordinates and normalized capacitance and resistance units expressed for each resistor/capacitor used to model this circuit portion. The DSPF representation might consist of tens of thousands of nets, or more, depending on the size of the LSI or VLSI project at issue, with dozens to hundreds of lines per net. Load time and processing time for a file of this type can often take tens of minutes, or more, and can be prohibitively-slow depending on the design.

To address this issue, the embodiment of FIG. 2 relies on an offline process (presented as a series of graphics above process separation line 202) which the embodiment uses to advance-digest the post-layout netlist file to dramatically improve processing speed. Rather than operate on the ASCII character DSPF or equivalent file (which can take tens of minutes to load and/or process, depending on project size), the method of FIG. 2 first loads the file (per numeral 207) and then converts it from ASCII to a binary form, and builds an index which identifies each net (and any other desired node or point) using a direct offset into the binary file, all per numerals 209 and 211. The resulting binary file and index file is stored in main memory for future use (213), while the index file is also loaded into RAM (i.e., local, fast-access memory 205) for purposes of parasitics' processing. When and as a designer wishes to evaluate performance of a particular section of a given circuit design, for example, the "DQ input pin" circuit portion referenced just above, the index is used to identify just that binary data which is needed for processing, and consequently to retrieve only a portion of the parasitics' data needed (as opposed to an entire, potentially-massive ASCII-based PLN or other parasitics' file) and to load only that portion from main memory to RAM for local processing. This pre-digesting of this data greatly reduces both load time and processing time, in many cases to such an extent that run-time parasitics' sensitivity processing as discussed herein can be performed quickly, potentially in real-time (i.e., instantaneously), even for large projects. In one contemplated embodiment, a memory manager can be used to perform direct memory access (DMA) in order to retrieve binary data of interest (e.g., such that ensuing processing is unencumbered by the need for file dynamic file allocation and/or address translation processing).

As represented by FIG. 2, and as before, a designer can be prompted by software to specify a given circuit design (e.g., a specific post-layout netlist file), a designer-specified circuit design characteristic that is to be gauged (e.g., selected from a drag-down list), a set of excitation/observation points that are to be analyzed, and any other designer-desired processing filters, per numeral 217. These items for example can be entered via a workstation or other processor-based device having one or more conventional user-interfaces, such as touch-screen, display screen, keyboard, mouse (or other cursor-control device), microphone, or other input device, as pictorially-represented by computer icon 219. These inputs are used to select and retrieve an index file into RAM, created as represented above (or to create such an index and associated binary file, as discussed above), and to load only those portions of the binary file needed for parasitics' sensitivity analysis into RAM, per numerals 221 and 223. The method/software then proceeds to compute parasitics' sensitivities as introduced earlier, parasitic-by-parasitic or structure-by-structure (e.g., layer-by-layer for a given 3D layout), per numeral 225. Such parasitics' sensitivity processing can once again be optionally rooted in normalized sensitivities, per function block 227 or in one or more of R, C, L and/or K, per function block 229. As indicated by numerals 231 and 233, any designer-specified filters or normalizations can optionally be applied at this point, e.g., to change the tolerance/resolution at which bottlenecks and sensitivities are evaluated; any detected issues can optionally be flagged to the designer via an alert or error indication (235) or otherwise identified graphically (e.g., by highlighting associated structures or rendering them with a specific color, such as red or yellow). In one embodiment, the designer can use a slider function (237), for example, moving a software-defined button on a display screen, to change tolerance criteria for which parasitics are highlighted or thresholded as individually or collectively contributing to a bottleneck; for example, software can be designed so as to emphasize parasitics (individually or collectively) which accounts for greater than x % of a bottleneck, where x is controlled by slider input (or other software or input function), such that as the designer scrolls the slider, software changes the set of parasitics and/or structures that are highlighted or displayed. Such a function provides the designer with a time-based visualization as to the order in which different physical structures create issues. In other embodiments, such a slider (or other software function) can be used to vary a threshold for defining an issue or bottleneck, i.e., such that no issue is identified if the overall parameter (T) is within desired norms, or to change a layer and/or resolution at which sensitivities are computed or displayed. Many examples of rendering and filtering processes will occur to those familiar with software design. As indicated by numeral 239, the software processes can generally be designed to identify the importance of individual sensitivities (i.e., sensitivity of the modeled circuit design characteristic "T" to individual parasitic elements and/or associated structural elements) and to display/screen different parasitics/structures meeting different requirements; in specific embodiments, the results of this processing/filtering can be visualized for the designer 241 (e.g., in a rendered display image) with temperature (i.e., coloring, highlighting or other emphasis), 243, being used as part of the display process so as to identify relative sensitivities, bottlenecks and other issues to a designer. As before, the parasitics' sensitivity data computed by these processes can be applied to computer-automated or computer-assisted layout; for example, a comparison of computed parasitics' sensitivities can be used to trigger automatic or suggested modification of any 2D or 3D structures, in terms of xyz position, sizing, materials and/or other factors, per numeral 245. A pareto optimal adjustment process can be applied or suggested, per numeral 247, according to designer-specified global parameters for a net or circuit of interest. When the suitable modifications are identified, as appropriate, software can prompt the designer to save modifications (251), with adjustment parameters being saved (253) to some or all of the post-layout netlist file and/or the layout/design file (e.g., in memory 203) and/or the binarized representation that file, and any associated other file or index, as appropriate.

FIGS. 3A-7C are used to provide illustrative examples that will assist understanding of some of the techniques introduced above. FIG. 3A graphically depicts a hypothetical 3D circuit structure, while FIG. 3B shows how parasitics' data can be processed (transformed) to generate sensitivity values that will then be applied in analyzing, visualizing, and potentially modifying a given circuit design of interest. FIGS. 4A-5B show spreadsheet examples illustrating how parasitics' data can be presented to a designer via a display, while FIGS. 6A-6B and 7A-7C provide examples for how relative sensitivities of a parameter to parasitics (and/or associated structures) can be graphically rendered to further assist visualization.

FIG. 3A is a 3D diagram that illustrates components of a hypothetical circuit design 301. Layers 311, 313 and 315 can represent part of a circuit path (i.e., a net) extending between a first point "A" and a second point "D," while layer 317 can represent a close-by structure that is part of a different net. In this case, for example, layers 311, 313 and 315 might represent different layers of a first net, while structure 317 might correspond to a path that is not intended to be electrically-coupled to layers 311, 313 and 315, yet is positioned proximally to these layers in order to provide for a relatively dense layout. Each of these layers and their interrelationship will in practice be characterized by parasitics, for example, unintended resistances, capacitances and inductances; notwithstanding that layers 311, 313 and 315 ideally should have no resistance between them, and that there should be infinite resistance between this net and layer 317, there are non-ideal parasitics which will inherently be present in any layout extraction, and some of these parasitics are represented in the FIG. by presence of the letter "C" (denoted unintended coupling capacitance) in between layers and associated arrows.

Applying techniques disclosed herein, a designer might wish to model behavior of the entire (larger) circuit relative to a performance parameter (e.g., voltage drop), or might wish to model behavior of only a limited part of the larger circuit, for example, voltage drop between depicted excitation point "A" and observation point "D." To this effect, software is designed to permit a user to specify one or both of these points and in some cases to select the circuit design characteristic of interest (e.g., RC delay, IR drop, or another performance parameter including those listed herein). In examples below, it will be generally assumed that a designer has specified excitation/observation points "A" and "D," and consequently that calculations will be focused on the net(s) connecting or relating to these points. Parasitics data provided for a post-layout netlist file, for example, as extracted from the xyz feature positioning of the various layers, models the depicted structures as a distributed network of parasitics. These parasitics typically account for material properties of the various depicted structures including for example each of the depicted layers and metal or any dielectric layer or other substance which separates them. The input data (including the post-layout netlist file) might also, depending on embodiment (and file type), convey statistical information representing process corners for assumed manufacturing variation.

As depicted in FIG. 3B, the techniques disclosed herein call for one or more processors, acting under the auspices of suitable software, to calculate parasitics' sensitivity data. Numeral 321 designates a hypothetical screenshot showing part of the sensitivity computation in one embodiment for a given circuit design characteristic "T" for the structure which was depicted in FIG. 3A.

Each parasitic which affects the net(s) of interest is first identified. For example, layer 311 was depicted in FIG. 3A as being a relatively long layer which electrically extends between point "A" and layer 313, and at places is also the closest layer in the "stack" depicted at the left side of FIG. 3A to structure 317, which is seen as extending laterally relative to layer 311. This is just one combination, and interaction between every pair of structural elements in this system can be modeled using one or more parasitics. As seen in FIG. 3B for example, the interrelationship between each layer combination can be modeled as one or more parasitics of the general form $P_{layer-i-layer-j}$, with each P in this case taking the form of a RLC or K value (though this is not required for all embodiments).

The parasitics which affect the net(s) of interest (e.g., A→D) are then processed so as to simulate/measure/calculate a value for the circuit design parameter of interest. As represented by the partial derivative expressions and statements seen in FIG. 3B, the designer's specification of "T" and a set of excitation/observation points are taken as an input by processor(s)/software, along with the parasitics' data, and used to simulate/measure/calculate a value for the specified circuit design characteristic; as noted, other factors such as process corners, assumed signals or ranges of signals on other nets (such as represented by structure 317) can also be taken into account. The processor(s)/software for this embodiment then identify the contribution that each individual parasitic element (or a group of parasitic elements) has upon the simulated/measured/calculate value. To this effect, the partial derivative or weight of each parasitic contributing to the value is calculated (e.g., assuming other parasitics to be static) so as to identify the sensitivity of T to that individual parasitic.

As an hypothetical example, it might be the case that structure 317 is "too close" to layer 313 and gives rise to unwanted coupling capacitance; if this capacitance is too great, this parasitic might create a performance bottleneck for a particular circuit design characteristic (e.g., RC delay) for signal path A→D. The computation of sensitivities in the manner described, and associated processing/visualization of results, provides the designer with a facilitated opportunity to both identify and quantify this impact. For example, in a simple example, the parasitics' sensitivity data produced by these steps might indicate that coupling capacitance between layer 313 and element 317 accounts for 23% of the RC delay between points "A" and "D" (if RC delay was the parameter of interest being assessed). Generating this data, and providing visualization to a designer of this data (or other data which permits the designer to see relative impact of various parasitics), permits the designer to take remedial action as appropriate. Note that while a limited number of parasitics are depicted in FIG. 3B, there can be many more parasitics that are considered/processed in a given case, as dependent on project size, selected points/nets, and the relationship of these elements to the rest of the circuit design as extracted.

Note that in practice, an extraction tool might conceptually subdivide layers (such as layer 311 and structural element 317) into sublayers or subelements (e.g., 311', 311", 311''', 317', 317" and 317''', seen in FIG. 6A) as necessary to model the system of interest as a distributed parasitics network. This conceptual subdivision will be discussed further below, but is not separately illustrated in FIGS. 3A-3B, to facilitate introduction of concepts relating to parasitic sensitivity derivation.

FIG. 4A provides a screenshot 401 showing sensitivity of overall path resistance to individual point-to-point resistances for a particular extracted layout. As a non-limiting example, it might be desired to monitor voltage drop and/or signal delay between various layers represented in that layout. Such a display might be generated and presented to a designer on a display monitor in order for a designer to visualize the effects that different layers have on the circuit design characteristic of interest for a net (or for nets) of interest. For example, going from left-to-right, the columns in FIG. 4A list layer name, point-to-point resistance imposed by the layer, the proportional resistance contributed by that layer to overall resistance of the net of interest, cumulative resistance (i.e., also considering the resistance of layers between the given layer and an excitation point), incremental resistance contributed by a via in an upward direction and a numerical identifier for that upward net or connection, if any, marginal resistance contributed by the via in a downward direction and a numerical identifier for that downward net or connection, if any. This permits a designer to detect situations where a via layer resistance is limited only by vias conducting current up or down (for example, on a path from driver to receiver, there may be only one via for current flowing up, and hundreds of vias for current going down). All results can be sorted according to value in any column and are, by default, sorted according to resistance and contribution of that resistance to the overall resistance of the net or nets of interest. For example, FIG. 4A shows layer "M2" to have the largest depicted resistance (101.57 ohms), which is 27.447% of the overall resistance for the specified net of 370.06 ohms. The next row entry, "VIA2" indicates that this structure is a via with 85.441 ohms resistance including 36.468 ohms in an upward direction (via 61) and 48.973 ohms in a downward direction (via 26). In case of vias, for example, a via may fan out in one direction (e.g., vertically upward, or in a direction having context to the designer-specified points) and continue in another direction (e.g., vertically downward, or in another direction having context to the designer-specified points or nets) and each direction may have different contributions to resistance imposed by that via on the selected net; for example, in the case of FIG. 4A, the upward direction might represent a root connection and having significantly larger effective resistance than a fan out to other layers for example. This information is very valuable and is presented in summarized (lumped) form in the screenshot of FIG. 4A (but can alternatively be presented in detail in a graphical rendering such as will be discussed in reference to FIG. 6A).

FIG. 4B provides a screenshot 411 showing sensitivity of RC delay to layer resistances for the circuit represented by the screenshot of FIG. 4A. As implied by this example, the parasitics' sensitivity data presented by this FIG. considers signal delay (s) with the parasitics of the various layers contributing to that delay. Once again, the data presented can be sorted independently for each column, with columns identifying (from left-to-right) delay [s], delay_percentage [%] and cumulative percentage. In this case, layer "M2" is once again seen as having the largest overall parasitic effect, contributing to 32.129% of the overall delay, with the parasitics of layer "VIA2" contributing a further 29.571% of the overall signal delay for the path of interest. A designer presented with the data in FIG. 4A for example can immediately identify that layers "M2" and "VIA2" together account for 61.7% of the overall delay for the net of interest; if the overall delay value (2.2843E-12) presents a bottleneck for the particular design, this data when visualized permits the designer to focus on redesign of select layers so as to reduce this relative contribution. Alternatively, when combined with software automation (e.g., a software module which adjusts a design according to pareto optimal parameters), this data for example might trigger automated or suggested adjustments to layers "M2," "VIA2," or other layers so as to reduce either or both of total delay for the net of interest, or the extent to which one or both of these layers dominates the aggregate delay for the net of interest.

FIG. 5A is a screenshot 501 showing sensitivity of RC delay to coupling capacitances to other nets. This data is used by the system in terms of calculating aggregate delays as well as sensitivity of a specified parameter (i.e., RC delay in this case) to individual parasitics. For example, the data of FIG. 5A indicates delay contributed by four different nets, including net "0" (77.491% of the overall delay), net "vdacp" (19.488% of the overall delay), net "clks" (2.5024% of the overall delay) and net "vdacn" (0.51804% of the overall delay). This data can also be broken down by individual layers or any other structural element in the design hierarchy as indicated by FIG. 5B, where each individual layer is sorted according to greatest contribution to overall delay (35.396% in the case of layer "ndiff"), with the same cumulative total delay for this FIG. as for FIG. 5A (2.2843E-12).

As noted earlier, the ability of the designer to visualize the positioning of parasitics and/or structural elements in a given layout and the relationship of their associated parasitic elements can be invaluable to identifying and correcting issues in a design. The techniques disclosed herein provide mechanisms which permit a designer to do that in a manner previously not possible. In some embodiments, therefore, the described computer-implemented methods and apparatuses (e.g., instructions on non-transitory machine-readable media) further combine parasitics' sensitivities into a graphical representation of the particular path of interest (e.g., of the physical structures with contributions to parasitics affecting a given circuit design characteristic at observation point(s)). FIG. 6A for example shows a 2D graphical depiction 601 of physical structures that make up a hypothetical circuit, rendered in a manner that graphically depicts sensitivity of the circuit design characteristic of interest (e.g., "RC delay") to each one of the depicted structural elements. For example, each layer/structure considered by the analysis is seen as drawn as a respective polygon, representing a trace or path (or portion thereof) modeled as a different parasitic element. The sensitivity of the circuit design characteristic of interest (in this case, RC delay) to the individual parasitic is colored (i.e., emphasized) in a way that permits a designer to immediately see where bottlenecks might arise for a net represented by the specified excitation and observation points. For example, in this particular case, as indicated by a legend in the lower-right corner of the FIG. 6A, polygons with a dark (thick) outer line (e.g., structure 613) have a greater proportionate influence on overall RC delay for the specific points, while structures with a thin outer line and simple hatching (e.g., structure 603) contribute least to the overall RC delay of the specified points. A designer concerned with the aggregate RC delay for the depicted structures might choose to focus on adjusting the layers/structures depicted the dark and thick outer lines as having the greatest immediate impact in reducing overall RC delay to desired maximums. As seen in this FIG., and given the indicated shading, structure 613 has a greater impact on overall RC delay than structure 611, which has a greater impact than structure 609, which has a greater impact than structure 607, and so on, continuing with structures 605 and 603. Note that "color" is used in this sense to refer to any manner of denoting relative importance emphasis, but it is also possible to use visual colors or other mechanisms to differentiate sensitivity values; for example, colors such as "red," "green," and "blue" can be used in lieu of shading or cross-hatching to indicate emphasis. In such an example, red colors can indicate relatively high sensitivity, meaning that adjustment of associated parasitics/structures will have the greatest incremental impact on adjusting/varying the circuit design characteristic being simulated/calculated modeled, while adjustment of blue (and to a lesser extent, green) structures will have a much less significant impact. Sensitivity weighting (such as color or other emphasis) can be presented/overlaid with graphical representations of parasitics and/or structural elements using other mechanisms, such as by displaying a sensitivity value each time a cursor is moved over a given structural element, and so forth. In one specifically-contemplated implementation, the highest sensitivities can be exhibited in dark red (e.g., structure 613), with light red being used for structure 611, orange for structure 609, dark green for structure 607, light green for structure 605, and blue for structure 603, and so on. Many different variations and means for graphically differentiating sensitivities will occur to those having ordinary skill in the art. As this discussion implies, in one embodiment, software generates (renders) a graphical representation of the actual layout of the given electronic circuit design, with sensitivities overlaid onto individual structures as appropriate.

Note that software can incorporate a wide range of designer preferences through the use of appropriate user filtering tools. For example, returning to FIG. 6A, a given designer might wish to visualize only sensitivities to parasitics exceeding a certain threshold, and so might use an appropriate button input (e.g., a slider) to change how structures are highlighted or which structures are highlighted (e.g., only structures where sensitivities exceed a designer-provided constraint).

FIG. 6B shows a 3D graphical depiction 621 of the structural elements from FIG. 3A, with the individual structural elements now graphically rendered in a manner that directly overlays sensitivity of a circuit design characteristic of interest (e.g., RC delay) onto to individual structural elements. It should be recalled that it was earlier mentioned that software can be designed so as to model a single layer as potentially many structural elements (e.g., substructures), depending on how that layer is configured and its interrelation to other nets, and potentially other factors. For example, layers 313 and 317 are now each seen as broken up into three separate structures (e.g., three substructures 313', 313" and 313''', and 317', 317" and 317'''), while layers 313 and 315 are each seen as broken into two substructures (313', 313", 315' and 315"). A designer employing such a 3D visualization mechanism, for example, can individually visualize the 3D layout of individual substructures and how those substructures individually affect performance of the overall net {A→D} in terms of the specified circuit design characteristic. For example, a designer looking at the depiction 621 might immediately conclude that substructures 313' and 317" provide the greatest contribution to RC delay of the net specified by excitation point "A" and observation point "D" (these are depicted in FIG. 3A), with parasitic $C_{313'-317''}$ dominating overall RC delay, and with depicted parasitics $C_{311'-317'}$, $C_{313'-317'''}$, $C_{315'-317'''}$, and $C_{315'-317'}$ contributing to a lesser extent to the overall RC delay. Again, the depicted highlighting scheme used to emphasize different sensitivities to the various parasitics (i.e., shading) is considered a design option, and a true colorization scheme (e.g., "red" versus "green" or other colors), can be optionally used in some embodiments.

As should be immediately apparent, the described visualization techniques provide a designer with different capabilities depending on objective. For example, the scheme depicted in FIGS. 6A and 6B can be used in concert with layout software (or layout adjustment software) to move individual traces in real time, and commit those adjustments back to the original design, on a dynamic, potentially real-time basis. A designer presented with the screenshot 621, for example, could in theory re-dimension or reposition structure 317 (or just substructure 317") so as to substantially reduce the greatest sensitivity to parasitics; for example, as a design moves structure 317 (317', 317", 317''') so as to be further away from structure/layer 313 (313', 313"), software can re-extract a modified design, recompute sensitivities (as appropriate) and change the presented coloring to indicate lower sensitivity of the circuit design characteristic for the overall path on any of the depicted sensitivities. Employed in the context of more sophisticated filters (e.g., no "coloring used" unless aggregate RC delay for the path satisfies a minimum threshold), these techniques present a powerful tool for identifying and resolving bottlenecks and other issues in real time. For example, with suitable software architecture, a designer could move structure 317 (substructures 317', 317", 317''') and see not only a red color transition to orange or blue, indicating reduced sensitivity to the physical properties associated with these structures (e.g., and their associated parasitics), but might see all coloring disappear as such movement reduces overall RC delay to a point where design constraints are no longer being violated. Obviously, more sophisticated processes can be applied as a matter of design discretion. What should be apparent is that by processing parasitics in the manner indicated, by performing specific processing to model/simulate/test a circuit design characteristic for a desired path, and by then computing sensitivity each constituent parasitic/structural element contributing to the computed value for the circuit design characteristic, a circuit design and/or analysis system can provide greatly improved capabilities of rapidly identifying and dynamically resolving issues, such as performance bottlenecks.

Figure 8:
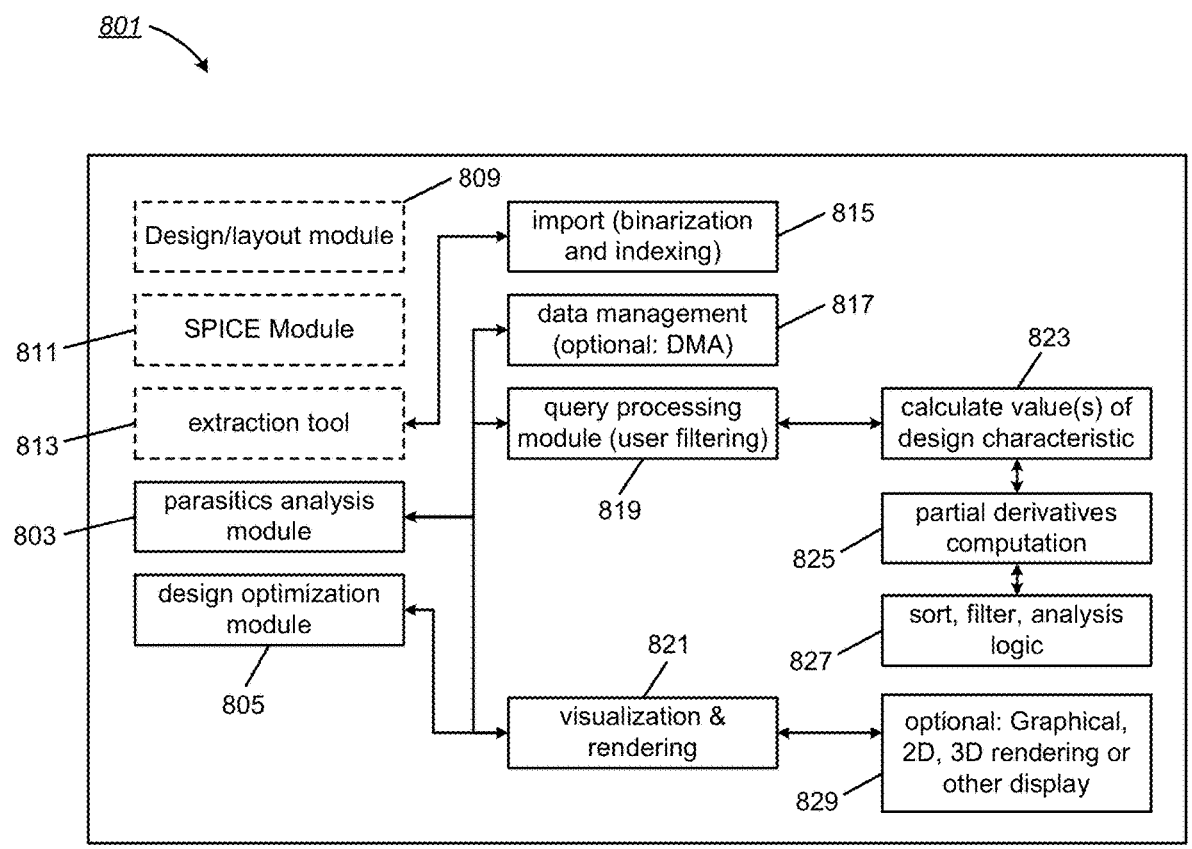
FIG. 8 is a block diagram showing one embodiment of a computer-based design tool embodying the described techniques, for example, as integrated with design/layout, SPICE and other software modules.

FIGS. 7A-7C show a number of different color-based visualizations based on calculated sensitivities; these figures help show that sensitivities can be grouped by layer or, indeed, any desired structural elements in any desired circuit design hierarchy, with renderings being filtered and/or switched so as to assist a designer. For example, FIG. 7A provides a screenshot 701 that once again visually colors polygons according to magnitude of calculated/measured/simulated sensitivity, in this case for a given layer only (e.g., "Metal 2"). As seen in a legend at the right-hand side of FIG. 7A, red colors represent high sensitivity magnitude (e.g., contribution by structural elements to the circuit design characteristic of interest, e.g., overall RC delay), while sky blue colors represent medium sensitivity magnitude to the circuit design characteristic of interest and dark blue represents low sensitivity. As indicated by a screenshot 711 in FIG. 7B, a designer can dynamically change views to select a different layer (i.e., in this case a "Metal 3" layer), once again with the magnitude of sensitivity of the same overall RC delay characteristic depicted for polygons associated with this layer; the colors in FIG. 7B represent the same colorization scheme (and associated magnitude ranges) as identified in the legend of FIG. 7A. FIG. 7C shows a third rendering 721 that again uses the same colorization scheme, in this case for layer "via 2." A suitably-designed GUI or other rendering tool can permit a designer to quickly explore 3D layout, in this case by filtering a view to and/or switching between segmented 2D representations, so as to visualize, evaluate and/or correct a circuit design of interest, for example, by honing in on how individual structural elements in individual layers impact sensitivity of the circuit design characteristic being simulated or modeled. By providing such a visualization ability for a myriad of different such characteristics (e.g., that can be selected by a designer for simulation, such as via a drag-down list), the techniques presented by this disclosure extend the capabilities of circuit analysis tools to permit a designer to evaluate designs for a myriad of different impacts of design parasitics and help identify and correct associated design problems FIG. 8 is a block diagram showing one embodiment of a computer-based design tool 801 embodying the described techniques, for example, as integrated with design/layout, SPICE and other software modules. Such a tool can be a comprehensive software package for circuit design or analysis, for example, similar to systems sold by Cadence Design Systems, Inc., Synopsys, Inc., and other similar companies. The depicted system can include a number of different software modules depending on implementation, for example, including a parasitics' analysis module 803 and a design optimization module 805. The parasitics' analysis module 803 can operate in the manner described above for example, by providing visualization of sensitivities of one or more circuit design characteristics to individual parasitics/ groups of parasitics (e.g., representing non-ideal behavior of a specific circuit structural element)—the visualization can be presented to a designer on a display screen of a computing device, e.g., via a GUI, and can take the form seen in FIGS. 3A-7C, or a different form. The design optimization module 805 can provide for automated or suggested design modification, or designer-assisted design modification, by providing a mechanism for the designer to respond to indicated parasitics' sensitivities and to adjust system/structural element design. The depicted system can also include other (optional) software elements as well, for example, a design/layout module 809 (used to initially and/or manually lay out a design for a given type of electronic circuit), a simulation module (e.g., SPICE module 811), to fully simulate circuit behavior using known techniques, and an extraction module or tool 813 (i.e., to extract a netlist and/or parasitics and present them in a recognizable file format, such as in a DSPF format). In some embodiments, other file formats (e.g., SPF, SPEF, OAEV, SPICE, HSPICE) or another type of format (e.g. a custom format for representing parasitics) can be used.

As indicated by the middle and right parts of FIG. 8, the depicted system can include modules to perform various ones of the functions already discussed above in connection with other embodiments. For example, an import module 815 can receive a relatively voluminous parasitics' file and can perform "pre-digesting" of that file (e.g., of a large post-layout netlist file) to create binarized versions and associated indexes. A data manager (data management module 817) can be used to manage access to just those limited portions of the binary file needed for processing, pulling them from main memory into local memory (RAM) when and as necessary, to provide for greatly improved processing speed. A query processing module 819 permits a designer to specify parameters of interest and perform data manipulation and filtering as desired; for example, as indicated by numerals 823 and 825, this module can supply inferred or designer-selected parameters to a software routine (823) that calculates a value a circuit design characteristic and a partial derivative computation routine (825) to compute sensitivities to individual parasitics which contribute to the aggregate, as indicated earlier. The query processing module 819 interacts with the designer to permit the designer to sort, filter and analyze the computed sensitivities to parasitics as may be desired, per numeral 827. Per numeral 821, a visualization and rendering module can be used to generate desired visualizations, including spreadsheets (as depicted above in connection with FIGS. 4A-5B) or more sophisticated renderings; for example, per numeral 829, 2D and 3D sensitivity representations can be overlaid with designs or otherwise graphed or charted in a manner that provides meaningful information to the designer.

As should be apparent from the foregoing, apparatuses and method which embody the techniques described in this disclosure can provide a powerful tool for analysis and debugging of IC designs sensitive to or dominated by layout parasitics, and can greatly streamline the process of circuit layout and design optimization. Note that the described techniques provide number of advantages in terms of providing new capabilities to a circuit designer, all with substantially-enhanced speed. In addition to other advantages already discussed above, a linear solver can be used to compute/measure/model a design characteristic of interest, providing substantial advantages over techniques that rely on complex convolutions and nonlinear analysis; the techniques discussed above provide a visualization mechanism that, in some embodiments, ignores device characteristics and instead relies on boundary conditions and parasitics as inputs, that is, facilitating faster, linear analysis. By using binarization and memory management techniques, as discussed earlier, and by enabling a design to filter parasitics used for computation (i.e., potentially focusing on a small set of parasitics) and/or thresholded for display, the techniques described above permit a designer (and design tool) to quickly identify and focus on just the most significant bottlenecks, in a manner that provides for heretofore efficiencies in identifying bottlenecks and other issues that would typically not be identified with conventional simulation tools. By providing a tool where a designer can select different circuit design characteristics and nets to model, the present techniques provide a robust mechanism that permits a designer to quickly and easily screen for a myriad of potential circuit design issue; as these techniques are fully integratable into/with traditional platform used for circuit analysis (e.g., layout, SPICE/simulation and other EDA tools), it should be appreciated that the techniques introduced by this disclosure provide for substantial improvement in the field of EDA.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

Various modifications and changes may be made to the embodiments presented herein without departing from the broader spirit and scope of the disclosure. Features or aspects of any of the embodiments may be applied, at least where practicable, in combination with any other of the embodiments or in place of counterpart features or aspects thereof. Accordingly, the features of the various embodiments are not intended to be exclusive relative to one another, and the specification and drawings are to be regarded in an illustrative rather than a restrictive sense.

I claim:

1. A processor-implemented method comprising:
   receiving a post-layout netlist file associated with a given electronic circuit design;
   receiving a specification of one or more excitation points and one or more observation points, defined with respect to the given electronic circuit design;
   for a given circuit design characteristic, obtaining digital values representing respective parasitic elements from the post-layout netlist file which are relevant to measurement of the given circuit design characteristic at the one or more observation points given a stimulus to be applied to the one or more excitation points;
   processing the digital values to calculate at least one value representing the given circuit design characteristic at the one or more observation points given the stimulus;
   calculating sensitivities of the at least one value representing behavior of the given circuit design characteristic to respective subsets of the parasitic elements; and
   performing at least one hardware-based function from the group of storing the sensitivities in digital memory, causing a display device to visually display a representation of the sensitivities on a display screen, and modifying a circuit design file representing the given electronic circuit design so as to change the design of one or more structural elements in the given electronic circuit design, in a manner so as to change the dependence of the at least one value on design of the one or more of the structural elements.

2. The processor-implemented method of claim 1, wherein the parasitic elements comprise a coupling capacitance between respective ones of the structural elements.

3. The processor-implemented method of claim 1, wherein the digital values representing the parasitic elements are embodied in at least one file of a Detailed Standard Parasitic Format (DSPF) file or a Standard Parasitic Exchange Format (SPEF) file or an Open Access (OA) extracted view file, and wherein obtaining the digital values comprises retrieving from digital memory in which the at least one file is stored digital values which identify respective parasitic elements of an integrated circuit design.

4. The processor-implemented method of claim 3, wherein:
   the processor-implemented method further comprises converting the at least one file to a binary format, storing the binary format in a main memory, and creating an index to the binary format;
   obtaining the digital values comprises identifying a location of the digital values which are relevant to measurement of the given circuit design characteristic from the index and loading a non-exhaustive subset of the binary format corresponding to the location from the main memory to a local memory; and
   calculating the sensitivities of the at least one value representing behavior of the given circuit design characteristic comprises calculating the sensitivities from the non-exhaustive subset which was loaded into local memory.

5. The processor-implemented method of claim 1, wherein:
   obtaining the digital values representing the respective parasitic elements comprises identifying structural elements which form part of the given electronic circuit design from the post-layout netlist file; and
   the processor-implemented method further comprises associating each of the identified structural elements with a mutually exclusive subset of one or more of the calculated sensitivities, such that each of the identified structural elements is associated with one or more of the parasitic elements represented by the post-layout netlist file.

6. The processor-implemented method of claim 1, wherein performing the at least one hardware-based function comprises causing display of a representation of the given electronic circuit design in a manner such that the representation of the given electronic circuit design visually depicts sensitivities of the at least one value representing behavior of the given circuit design characteristic to respective subsets of the parasitic elements, relative to others of the parasitic elements which are relevant to the measurement of the given circuit design characteristic at the one or more observation points.

7. The processor-implemented method of claim 6, wherein causing the display includes rendering colors respective to one or more of the respective subsets of the parasitic elements, in a manner such that each color is dependent on a magnitude of calculated sensitivity of the at least one value representing behavior of the given circuit design characteristic.

8. The processor-implemented method of claim 6, wherein causing the display includes rendering a graphical representation of the one or more structural elements, in a manner such that the display associates a given one of the one or more structural element with one of the calculated sensitivities of the given circuit design characteristic which is attributable to a parasitic element in the subset arising from the given one of the individual structures.

9. The processor-implemented method of claim 6, wherein the processor-implemented method further comprises:
receiving a user-input representing dynamic adjustment in a physical characteristic of a given one of one or more structural elements;
creating a graphical representation for presentation on a display device; and
changing a rendering of the graphical representation in a manner that depicts change in sensitivity of the at least one value representing behavior of the given circuit design characteristic which is attributable to the dynamic adjustment.

10. The processor-implemented method of claim 1, wherein the method further comprises receiving a user-input representing a selection of the given circuit design characteristic from a group of alternative characteristics, the group including at least one parameter from the group of a resistance, a signal delay, a voltage drop, a frequency response, a current density, or a bandwidth.

11. The processor-implemented method of claim 1, wherein the parasitic elements comprise at least one of a resistance, a capacitance, a self-inductance or a mutual inductance.

12. The processor-implemented method of claim 1, wherein performing the at least one hardware-based function comprises causing a display device to visually display a listing of at least two of the calculated sensitivities, in a manner sorted according to a structural element of the one or more structural elements.

13. The processor-implemented method of claim 1, wherein performing the at least one hardware-based function comprises causing a display device to visually display a listing of at least two of the calculated sensitivities, in a manner grouped according to a selected structural element of the one or more structural elements.

14. An apparatus comprising instructions stored on non-transitory storage media, said instructions when executed to cause at least one processor to:
receive a post-layout netlist file associated with a given electronic circuit design;
receive a specification of one or more excitation points and one or more observation points, defined with respect to the given electronic circuit design;
for a given circuit design characteristic, obtain digital values representing respective parasitic elements from the post-layout netlist file which are relevant to measurement of the given circuit design characteristic at the one or more observation points given a stimulus to be applied to the one or more excitation points;
process the digital values to calculate at least one value representing the given circuit design characteristic at the one or more observation points given the stimulus;
calculate sensitivities of the at least one value representing behavior of the given circuit design characteristic to respective subsets of the parasitic elements; and
perform at least one hardware-based function from the group of storing the sensitivities in digital memory, causing a display device to visually display a representation of the sensitivities on a display screen, and modifying a circuit design file representing the given electronic circuit design so as to change the design of one or more structural elements in the given electronic circuit design, in a manner so as to change the dependence of the at least one value on design of the one or more of the structural elements.

15. The apparatus of claim 14, wherein the parasitic elements comprise a coupling capacitance between respective ones of the structural elements.

16. The apparatus of claim 14, wherein the digital values representing the parasitic elements are embodied in at least one file of a Detailed Standard Parasitic Format (DSPF) file or a Standard Parasitic Exchange Format (SPEF) file or an Open Access (OA) extracted view file, and wherein said instructions, when executed, are to cause at least one processor to retrieve from digital memory in which the at least one file is stored digital values which identify respective parasitic elements of an integrated circuit design.

17. The apparatus of claim 16, wherein said instructions, when executed, are to cause at least one processor to:
convert the at least one file to a binary format, storing the binary format in a main memory, and create an index to the binary format;
identify a location of the digital values which are relevant to measurement of the given circuit design characteristic from the index and load a non-exhaustive subset of the binary format corresponding to the location from the main memory to a local memory; and
calculate the sensitivities from the non-exhaustive subset which was loaded into local memory.

18. The apparatus of claim 14, wherein said instructions, when executed, are to cause at least one processor to:
identify structural elements which form part of the given electronic circuit design from the post-layout netlist file; and
associate each of the identified structural elements with a mutually exclusive subset of one or more of the calculated sensitivities, such that each of the identified structural elements is associated with one or more of the parasitic elements represented by the post-layout netlist file.

19. The apparatus of claim 14, wherein said instructions, when executed, are to cause at least one processor to cause display of a representation of the given electronic circuit design in a manner such that the representation of the given electronic circuit design visually depicts sensitivities of the at least one value representing behavior of the given circuit design characteristic to respective subsets of the parasitic elements, relative to others of the parasitic elements which are relevant to the measurement of the given circuit design characteristic at the one or more observation points.

20. The apparatus of claim 19, wherein said instructions, when executed, are to cause at least one processor to render colors respective to one or more of the respective subsets of the parasitic elements, in a manner such that each color is dependent on a magnitude of calculated sensitivity of the at least one value representing behavior of the given circuit design characteristic.

21. The apparatus of claim 19, wherein said instructions, when executed, are to cause at least one processor to render a graphical representation of the one or more structural elements, in a manner such that the display associates a given one of the one or more structural element with one of the calculated sensitivities of the given circuit design characteristic which is attributable to a parasitic element in the subset arising from the given one of the individual structures.

22. The apparatus of claim 19, wherein said instructions, when executed, are to cause at least one processor to:

receive a user-input representing dynamic adjustment in a physical characteristic of a given one of one or more structural elements; and create a graphical representation for presentation on a display device; and change a rendering of the graphical representation in a manner that depicts change in sensitivity of the at least one value representing behavior of the given circuit design characteristic which is attributable to the dynamic adjustment.

23. The apparatus of claim 14, wherein said instructions, when executed, are to cause at least one processor to receive a user-input representing a selection of the given circuit design characteristic from a group of alternative characteristics, the group including at least one parameter from the group of a resistance, a signal delay, a voltage drop, a frequency response, a current density, or a bandwidth.

24. The apparatus of claim 14, wherein the parasitic elements comprise at least one of a resistance, a capacitance, a self-inductance or a mutual inductance.

25. The apparatus of claim 14, wherein said instructions, when executed, are to cause at least one processor to cause a display device to visually display a listing of at least two of the calculated sensitivities, in a manner sorted according to a structural element of the one or more structural elements.

26. The apparatus of claim 14, wherein said instructions, when executed, are to cause at least one processor to cause a display device to visually display a listing of at least two of the calculated sensitivities, in a manner grouped according to a selected structural element of the one or more structural elements.

* * * * *